(12) United States Patent
McCourt et al.

(10) Patent No.: US 11,429,901 B1
(45) Date of Patent: Aug. 30, 2022

(54) PITMAN-YOR PROCESS TOPIC MODELING PRE-SEEDED BY KEYWORD GROUPINGS

(71) Applicant: Invoca, Inc., Santa Barbara, CA (US)

(72) Inventors: Michael McCourt, Santa Barbara, CA (US); Victor Borda, Santa Barbara, CA (US)

(73) Assignee: INVOCA, INC., Santa Barbara, CA (US)

( * ) Notice: Subject to any disclaimer, the term of this patent is extended or adjusted under 35 U.S.C. 154(b) by 0 days.

(21) Appl. No.: 17/552,991

(22) Filed: Dec. 16, 2021

(51) Int. Cl.
*G10L 15/04* (2013.01)
*G06N 20/00* (2019.01)
*G06F 40/40* (2020.01)

(52) U.S. Cl.
CPC ............. *G06N 20/00* (2019.01); *G06F 40/40* (2020.01)

(58) Field of Classification Search
CPC ............................... G06N 20/00; G06F 40/40
USPC ............................................................ 704/9
See application file for complete search history.

(56) References Cited

U.S. PATENT DOCUMENTS

| | | | | |
|---|---|---|---|---|
| 8,180,777 | B2 * | 5/2012 | Duchon | G06Q 10/04 707/738 |
| 10,726,061 | B2 * | 7/2020 | Chu | G10L 15/1815 |
| 10,984,781 | B2 * | 4/2021 | Griffiths | G06F 40/216 |
| 10,990,763 | B2 * | 4/2021 | Peterson | G06F 40/253 |
| 11,115,520 | B2 * | 9/2021 | McCourt | G06N 7/005 |
| 2011/0040764 | A1 * | 2/2011 | Duchon | G06Q 10/04 707/738 |
| 2013/0297582 | A1 * | 11/2013 | Zukovsky | G06F 16/9535 707/706 |
| 2013/0297590 | A1 * | 11/2013 | Zukovsky | G06F 16/951 707/722 |
| 2019/0155947 | A1 * | 5/2019 | Chu | G06N 5/04 |
| 2021/0118432 | A1 * | 4/2021 | McCourt | G10L 15/1815 |
| 2021/0118433 | A1 * | 4/2021 | McCourt | G10L 15/1815 |
| 2021/0120121 | A1 * | 4/2021 | McCourt | H04M 3/2218 |
| 2022/0036010 | A1 * | 2/2022 | Sengupta | G06N 7/005 |

\* cited by examiner

*Primary Examiner* — Khai N. Nguyen
(74) *Attorney, Agent, or Firm* — Baker Botts L.L.P.

(57) ABSTRACT

In one embodiment, the disclosed technology involves: digitally generating and storing a machine learning statistical topic model in computer memory, the topic model being programmed to model call transcript data representing words spoken on a call as a function of one or more topics of a set of topics that includes pre-seeded topics and non-pre-seeded topics; programmatically pre-seeding the topic model with a set of keyword groups; programmatically training the topic model using unlabeled training data; conjoining a classifier to the topic model to create a classifier model; programmatically training the classifier model using labeled training data; receiving target call transcript data; programmatically determining at least one of one or more topics of the target call or one or more classifications of the target call; and digitally storing the target call transcript data with additional data indicating the determined topics and/or classifications of the target call.

20 Claims, 10 Drawing Sheets

US 11,429,901 B1

PITMAN-YOR PROCESS TOPIC MODELING PRE-SEEDED BY KEYWORD GROUPINGS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Invoca, Inc.

TECHNICAL FIELD

One technical field of the disclosure is computer-implemented artificial intelligence, in the subfield of natural language processing, using models that are programmed to automatically categorize natural language data. Another technical field is improvements to Bayesian Belief Network models and model generation techniques. Another technical field is semi-supervised machine learning model development, training, and deployment. Other technical fields include representation learning and active learning in the field of machine learning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Automatic classification of written and verbal communications can be extremely useful for grouping large numbers of communications for review, analysis, or intervention. While there are many known techniques for classification of written communications, such techniques typically require either design by an expert, or a large amount of labelled training data. In either case, such models can be prohibitively expensive to curate. Moreover, many classification techniques in common use cannot readily be interpreted, and therefore may not be suitable in circumstances where auditing for fairness or correctness must be provided.

Conversely, a conventional admixture model, otherwise known as a topic model, may be leveraged to impose an underlying semantic structure on a data set without the need for any labelled training data. With an admixture model, topics representing recurring thematic elements in a dataset can be represented as mixtures of words or probability distributions over words. However, conventional admixture models are subject to certain disadvantages.

For example, conventional admixture models may be incapable of using labelled training data or accounting for themes known or assumed to exist within a data set based on prior knowledge. These limitations may necessitate using a large amount of unlabelled training data to impose a semantic structure on the data set. Moreover, while a conventional admixture may generate topics associated with words determined to be related, each and every one of these generated topics will initially be unnamed. Hence, a large amount of human intervention is typically required to interpret the output of a conventional admixture model and ascribe pragmatic meaning to the topics found to exist in a data set.

Thus, there is a need for improved artificial intelligence models for classifying phone conversations. If a highly predictive, highly interpretable model capable of leveraging a priori knowledge of themes or topics likely to be present in a data set could be developed, then it would represent a significant advance in the state of the art.

SUMMARY

The appended claims may serve as a summary of the invention.

BRIEF DESCRIPTION OF THE DRAWINGS

In the drawings:

FIG. 4E illustrates, in one embodiment, the relation between probability distributions p and parent distributions in the Pitman-Yor-Process (PYP) with some associated concentration b and discount a.

DETAILED DESCRIPTION

Figure 1:
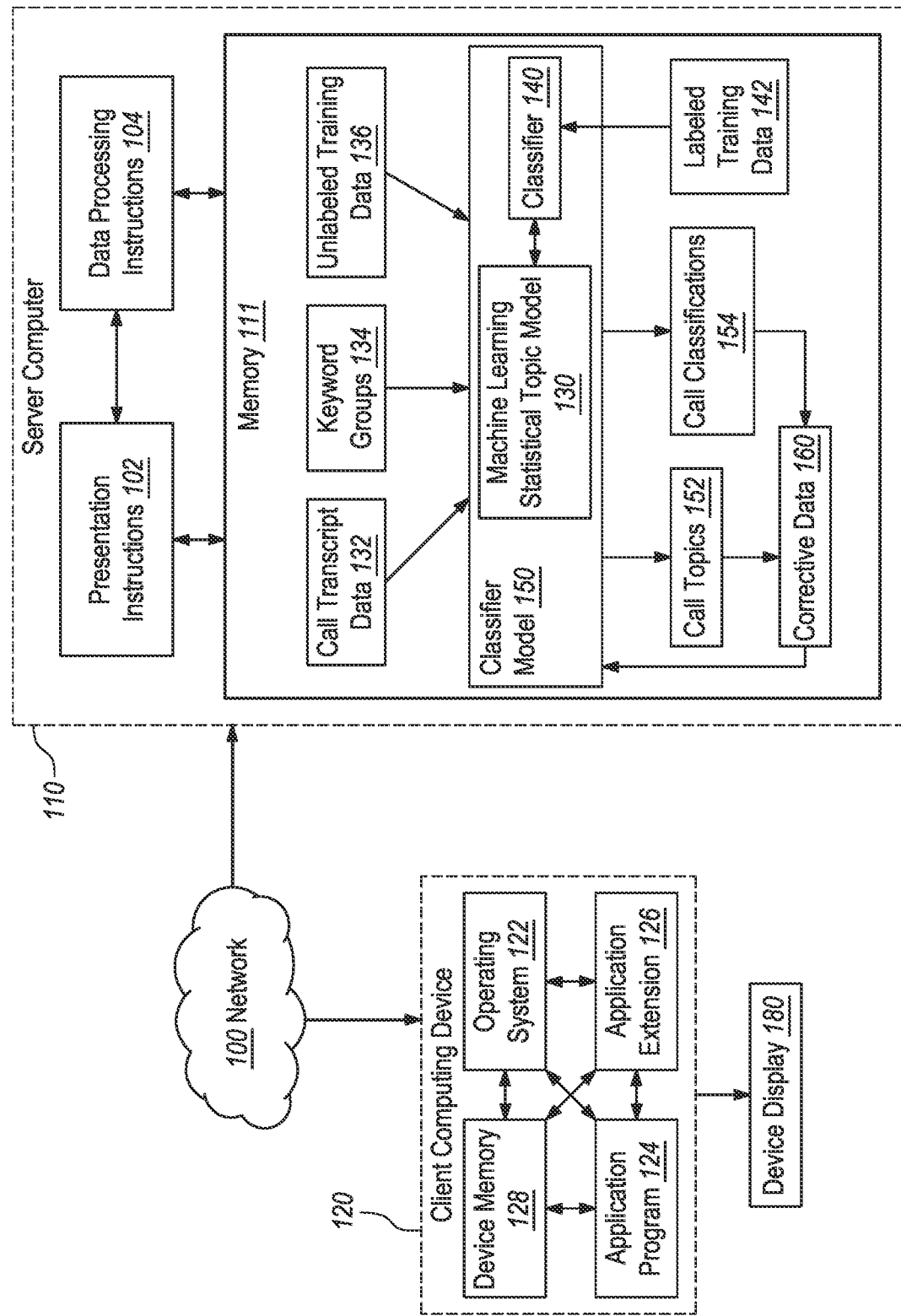
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. The Classifier Model
4. The Feature Model
4.1 Topic Pre-seeding by Keyword Groupings
4.2 Speaking Party Segregation
4.3 Extensions
5. Sampling Algorithm for the Conjoined Model
5.1 Sampling Algorithm for the Classifier
5.2 Sampling Algorithm for the Feature Model
5.3 Sampling Algorithm for the Feature Model with Speaking Party Segregation
5.4 The Pitman-Yor Process
6. Topic, Classification, and Explainability Data Display
7. Implementation Example—Hardware Overview
8. Benefits and Improvements
1. General Overview Embodiments of the disclosed technology include a representation learning model for classification of natural language text. In embodiments, a classification model comprises a feature model and a classifier. The feature model may be manually coded or may be considered a form of representational learning if it is learned automatically from data. As in deep learning models, the feature model of one or more embodiments may be hierarchical in nature: data may pass through a series of representations, decreasing in specificity and increasing in generality. Intermediate levels of representation may then be used as automatically learned features to train a statistical classifier. The level of representation may not be restricted by the model and may be changed to suit any given task.

The feature model of one or more embodiments may be based on a hierarchical Pitman-Yor process. Since the Pitman-Yor process defines a probability distribution over Zipf-type distributions, it may provide a convenient mathematical basis for models of natural language. The overall structure of the network need not be learned from the data; instead, only parameter values need to be learned. Because of this inductive bias, the Pitman-Yor-based models of one or more embodiments may be trained using much less data than artificial neural networks typically require. Moreover, since the structure of the network is known from the outset, elements of the model can thus be identified with vocabulary, topical themes, or dialectal variants. Quantities for these elements may then be learned from the data and can be inspected.

Another advantage of using the Pitman-Yor process in one or more embodiments is that it is entirely statistical in nature. It may be advantageous to learn Zipf-type probability distributions to represent predictive aspects of language. The Pitman-Yor process defines a probability distribution over Zipf-type distributions. By using the Pitman-Yor process as a prior distribution, machine learning may be implemented using Bayes' theorem to obtain posterior distributions over each of a set of inferred quantities. In one or more embodiments, the feature model may automatically quantify the uncertainty in each of its parameters and predictions and is therefore not prone to over-fitting. This property facilitates automatic training of the feature model and enables it to be used in feedback-based training loops such as active learning.

Since the Pitman-Yor process defines a fully statistical relationship between elements of the model disclosed herein, the feature model may be expressed as a Bayesian Belief Network. Thus, variations in the data such as variations by season, region, dialect, or advertising campaign may be accounted for by imposing a hierarchical structure on the data in which subsequent layers may represent specializations of higher layers. Such modifications increase the inductive bias of the disclosed model, increasing both its interpretability and its ability to train effectively on small datasets.

Once the feature model has been expressed as a Bayesian Belief Network and one or more features of the feature model have been selected for prediction, the feature model may be attached to a classifier. Any type of classifier, which defines a probability distribution over labels when conditioned on input features P(labels l|features f), can be used. Multiplying this distribution by the feature model P(features f, data d) generates a joint distribution over labels, features, and data P(l|f) P(f, d)=P(l, f d). The integrated model can then be trained using Bayes' theorem to obtain a model for labels and features conditioned on the data P(l, f|d)=P(l, f d)/P(d). Integrating this distribution over features f provides a probability distribution over labels l.

The Bayesian Belief Network of embodiments may take the form of an admixture model, otherwise known as a topic model; however, the topic model of embodiments may differ from a typical topic model because it may be programmed with one or more pre-seeded topics before being trained using an unlabeled data set. As explained with greater specificity herein, topic pre-seeding may be effectuated by programming the topic model to model K topic distributions to include $\tilde{K}$ mixture topic distributions $(1-\pi_k)\phi_k+\pi_k\dot\phi_k$ and $(K-\tilde{K})$ non-mixture topic distributions $\phi_k$, the $\tilde{K}$ mixture topic distributions being respectively associated with the one or more pre-seeded topics. Thus, the disclosed technology includes a novel framework for boot-strapping a classification model from the zero state, such that it may yield approximately correct predictions, even before any labeled data has been supplied to the model.

In embodiments, boot-strapping the topic model with pre-seeded topics provides a novel method for programmatically incorporating a priori knowledge of themes or topics likely to be present in a data set into the topic model, potentially expediting the model training process. In embodiments, after conjoining the boot-strapped topic model with a classifier to form a classifier model, the classifier model may obtain an acceptable level of accuracy after training on as few as 30 labeled call transcripts. In one embodiment, after the classification model is trained, at a server computer, using an initial set of training data, an active learning loop may be programmatically initiated to automatically correct for any subsequent decline in accuracy.

One example computer-implemented method comprises: digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics; programmatically pre-seeding the topic model with a set of keyword groups, each keyword group associating a respective set of keywords with a topic of the set of pre-seeded topics; programmatically training the topic model using unlabeled training data;

conjoining a classifier to the topic model to create a classifier model, the classifier defining a joint probability distribution over topic vectors and observed labels; programmatically training the classifier model using labeled training data; receiving target call transcript data comprising an electronic digital representation of a verbal transcription of a target call; programmatically determining, using the classifier model, at least one of one or more topics of the target call or one or more classifications of the target call; and digitally storing the target call transcript data with additional data indicating the determined one or more topics of the target call and/or the determined one or more classifications of the target call.

One method involves the topic model being programmed to model each word represented in the call transcript data as being drawn from one or more topic probability distributions of a plurality of topic probability distributions, the plurality of topic probability distributions comprising a plurality of mixture topic probability distributions each modeled as being drawn from a first type of prior distribution and being associated with a pre-seeded topic and a plurality of non-mixture topic probability distributions each modeled as being drawn from a second type of prior distribution and being associated with a non-pre-seeded topic.

One method involves the first type of prior distribution from which each mixture topic distribution is modeled as being drawn from being non-zero only for the words associated, by a keyword group, with the pre-seeded topic associated with that respective mixture topic distribution.

One method involves the machine learning statistical topic model defining, for each word represented in the unlabeled training data, a joint probability distribution over the word, a latent topic assignment of the word, and an indicator parameter, the indicator parameter denoting whether the word was associated, by a keyword group, with a pre-seeded topic.

One method involves the probability distribution of topics being modeled as a function of an inferred prior probability distribution which is modeled as a function of a flat prior distribution.

One method involves the probability distribution of topics being modeled as a function of the inferred prior probability distribution using a Pitman-Yor Process and the inferred prior probability distribution being modeled as a function of the flat prior distribution using a Pitman-Yor Process.

One method involves the classifier being programmed as a linear classifier comprising one of a Finnish Horseshoe Model, an L2 Logistic Regression, or a Logistic Regression using the Horseshoe Potential.

One method comprises programmatically training the classifier model using a Rao-Blackwellization process and a Hamiltonian Monte Carlo algorithm to update the classifier.

One method involves the unlabeled training data comprising an initial set of call transcript data, each call transcript data of the initial set of call transcript data comprising an electronic digital representation of a verbal transcription of a call between a first person of a first person type and a second person of a second person type, the initial set of call transcript data having been created based on speech-to-text recognition of audio recordings of an initial set of calls.

One method comprises transmitting, to a client computing device, control instructions formatted to cause indicating, in a graphical user interface, for each of a plurality of topics, a number or percentage of calls received for that topic over a particular period of time.

One method comprises, responsive to receiving at a server computer, from a client computing device, a first feedback input indicating that one or more determined topics or classifications of the target call were incorrect, programmatically updating the classifier model based on the first feedback input.

One method comprises, responsive to determining at the server computer, based on a set of feedback input comprising the first feedback input, that a prediction accuracy of the classifier model is below a threshold prediction accuracy, programmatically updating the classifier model using a corrective data set.

One method comprises transmitting, to a client computing device, control instructions formatted to cause displaying, in a graphical user interface, explainability data related to a prediction of the one or more classifications of the target call, the explainability data indicating causation on at least one of a per-topic basis or a per-word basis.

One example computer-implemented method comprises: digitally generating and storing a machine learning statistical topic model in computer memory, the topic model comprising a first word branch, a second word branch, and a topic branch, the topic model being programmed to receive, as input, call transcript data comprising first person type data digitally representing words spoken by a first person of a first person type in a call and second person type data digitally representing words spoken by a second person of a second person type in the call, the first person type data being modeled using the first word branch and the second person type data being modeled using the second word branch, the topic branch being programmed to model one or more topics of the call as a function of a probability distribution of topics, each of the one or more topics of the call being modeled as one of a pre-seeded topic or a non-pre-seeded topic; programmatically pre-seeding the topic model with a set of keyword groups, each keyword group associating a respective set of keywords with a topic of a set of pre-seeded topics; programmatically training the topic model using unlabeled training data; conjoining a classifier to the topic model to create a classifier model, the classifier defining a joint probability distribution over topic vectors and observed labels; programmatically training the classifier model using labeled training data; receiving target call transcript data comprising an electronic digital representation of a verbal transcription of a target call; programmatically determining, using the classifier model, at least one of one or more topics of the target call or one or more classifications of the target call; and digitally storing the target call transcript data with additional data indicating the determined one or more topics of the target call and/or the determined one or more classifications of the target call.

One method involves: the first word branch being programmed to model the first person type data as being drawn from one or more topic probability distributions of a first plurality of topic probability distributions, the first plurality of topic probability distributions comprising a first plurality of mixture topic probability distributions each modeled as being drawn from a first type of prior distribution and being associated with a pre-seeded topic and a first plurality of non-mixture topic probability distributions each modeled as being drawn from a second type of prior distribution and being associated with a non-pre-seeded topic; and the second word branch being programmed to model the second person type data as being drawn from one or more topic probability distributions of a second plurality of topic probability distributions, the second plurality of topic probability distributions comprising a second plurality of mixture topic probability distributions each modeled as being drawn from the first type of prior distribution and being associated with a pre-seeded topic and a second plurality of non-mixture topic probability distributions each modeled as being drawn from the second type of prior distribution and being associated with a non-pre-seeded topic.

One method involves the probability distribution of topics being modeled as a function of an inferred prior probability distribution which is modeled as a function of a flat prior distribution.

One method involves the probability distribution of topics being modeled as a function of the inferred prior probability distribution using a Pitman-Yor Process and the inferred prior probability distribution being modeled as a function of the flat prior distribution using a Pitman-Yor Process.

2. Structural & Functional Overview

FIG. 1 illustrates a distributed computer system showing the context of use and principal functional elements with which one embodiment could be implemented. In one embodiment, distributed computer system 110 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of digitally classifying phone conversations. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a distributed computer system comprises a server computer 110 that is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, the client computing device 120, and other elements of the system may each comprise an interface compatible with the network 100 and may be programmed or configured to use standardized protocols for communication across the networks such as TCP/IP, Bluetooth, or higher-layer protocols such as HTTP, TLS, and the like.

In one embodiment, client computing device 120 may be a computer that includes hardware capable of communicatively coupling the device to one or more server computers, such as server computer 110, over one or more service providers. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional internet browser application that is capable of communicating over network 100 to other functional elements via HTTP and is capable of rendering dynamic or static HTML, XML, or other markup languages, including displaying text, images, accessing video windows and players, and so forth. In some embodiments, server computer 110 may provide an application extension 126 for application program 124 through which the aforementioned communication and other functionality may be implemented. In embodiments, a device display 180, such as a screen, may be coupled to the client computing device 120.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location, or co-located with other elements in a datacenter, shared computing facility, or cloud computing facility.

Referring again to FIG. 1, in one embodiment, server computer 110 may comprise data processing instructions 104 coupled to both presentation instructions 102 and memory 111. The memory 111 may represent any memory accessible by the server computer 110 including a relational database, a data lake, cloud data storage, local hard drives, computer main memory, or any other form of electronic memory. In various embodiments, server computer 110 may store and execute sequences of programmed instructions of various types to cause execution of various methods. As one example, server computer 110 may execute the data processing instructions 104 and the presentation instructions 102 in various programmed methods, but server computer 110 may also execute other types of programmed instructions in one or more embodiments. The data processing instructions 104 may be executed by the server computer 110 to process or transform data, such as by executing a programmed machine learning model, or to cause data stored in memory 111 to be transmitted to client computing device 120 over the network 100. In various embodiments, presentation instructions 102 may be executed by server computer 110 to cause presentation in a display of a computing device communicating with server computer 110 over network 100, such as client computing device 120, or to cause the transmission of display instructions to such a computing device, the display instructions formatted to cause such presentation upon execution.

Rather than comprising a general-purpose computer, the server computer 110 is specially configured or programmed with the functional elements shown in FIG. 1. In one embodiment, server computer 110 is programmed to receive call transcript data 132 comprising call transcripts over network 100 from client computing device 120 and to store the call transcript data. In one embodiment, call transcript data 132, including one or more call transcripts, is stored in memory 111 of server computer 110. Each call transcript may comprise an electronic digital representation of a verbal transcription of a call between two or more parties. For example, a call transcript for a call dealership may comprise written dialogue between an agent and a customer that has been transcribed from an audio conversation between the agent and the customer. The call transcripts may include data labeling portions of the dialogue with identifiers of the parties and/or party types. For example, when used for conversations between a customer and a goods or services provider, the portions of the dialogue may be labeled based on whether the portions were spoken by a customer or by an agent of the goods or services provider.

Referring again to FIG. 1, in one embodiment, server computer 110 may execute programmed instructions formatted to cause generating and/or digitally storing a classifier model 150 comprising a machine learning statistical topic model 130 and a classifier 140. In one embodiment, the machine learning statistical topic model 130 is programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics. The classifier model 150 may comprise computer readable instructions which, when executed by one or more processors, cause the server computer 110 to compute one or more output outcomes or labels based on input call transcripts. The classifier model 150 may comprise a mathematical model that is trained at the server computer 110 or trained at an external computing device and provided to server computer 110. In some embodiment, the classifier model 150 is digitally stored in memory 111 of server computer 110. In some embodiments, the classifier model 150 may instead be digitally stored in device memory 128 of client computing device 120 after it is trained at server computer 110.

In one embodiment, server computer 110 may execute programmed instructions formatted to cause pre-seeding the machine learning statistical topic model 130 with a set of keyword groups 134, each keyword group associating a respective set of keywords with a topic of the set of pre-seeded topics. For example, the machine learning statistical topic model 130 may be programmed to model each word represented in the call transcript data 132 as being drawn from one or more topic probability distributions of a plurality of topic probability distributions, the plurality of topic probability distributions comprising a plurality of mixture topic probability distributions each modeled as being drawn from a first type of prior distribution and being associated with a pre-seeded topic and a plurality of non-mixture topic probability distributions each modeled as being drawn from a second type of prior distribution and being associated with a non-pre-seeded topic. In one embodiment, the keyword groups 134 are stored in memory 111 of server computer 110. In one embodiment, digital input specifying one or more of the keyword groups 134 or pre-seeded topics is received, at server computer 110, from client computing device 120, over network 100.

In one embodiment, server computer 110 may execute programmed instructions formatted to cause training the topic model using unlabeled training data 136. In one embodiment, the unlabeled training data 136 may comprise an initial set of call transcript data, each call transcript data of the initial set of call transcript data comprising an electronic digital representation of a verbal transcription of a call between a first person of a first person type and a second person of a second person type, the initial set of call transcript data having been created based on speech-to-text recognition of audio recordings of an initial set of calls. In various embodiments, the classifier 140 may be conjoined with the machine learning statistical topic model 130, either before or after the pre-seeding with keyword groups 134 or the training with unlabeled training data 136 at server computer 110. In various embodiments, the classifier 140 may be programmed as a linear classifier comprising one of a Finnish Horseshoe Model, an L2 Logistic Regression, or a Logistic Regression using the Horseshoe Potential, or as another type of classifier, linear or nonlinear.

In one embodiment, server computer 110 may execute programmed instructions formatted to cause training the classifier model 150 using labeled training data 142, which may be stored in memory 111. In one embodiment, the classifier model 150 is initially trained with a set of labeled training data 142 annotated by human domain-specific experts and subsequently updated through active learning.

In one embodiment, server computer 110 may execute programmed instructions formatted to cause inputting call transcript data 132 into the classifier model 150 to automatically evaluate one or more call transcripts. Using the classifier model 150, as described further herein, the server computer 110 may execute programmed instructions formatted to cause identifying one or more abstract representations for the call transcripts, which are then used to programmatically predict outcomes or call classifications 154 (in other words, classification labels) for the calls. In one embodiment, server computer 110 may execute programmed instructions formatted to cause determining one or more call topics 152 for each call. Server computer 110 may then execute programmed instructions formatted to cause digitally storing the call transcripts with data identifying the one or more representations, outcomes, labels, or topics. In one embodiment, server computer 110 is programmed to store additional data relating to the one or more representations, outcomes, labels, or topics. In some embodiments, the server computer 110 may execute programmed instructions formatted to remove a call transcript from digital storage after its representations have been identified.

In one embodiment, additional data stored with call transcripts includes explainability data related to the labeling of one or more topics or the prediction of one or more outcomes or labels. Bayesian models, such as the models of the present disclosure, may have technical advantages over neural models which tend to be "black box," in that the Bayesian models can be programmed to output robust explainability data. Here, data may be represented in the form of topics. Thus, server computer 110 may be programmed, in an embodiment, to execute instructions formatted to cause highlighting or other identification of one or more topics in a digital representation of a call transcript which contributed most to a predicted label or outcome. In an embodiment, this highlighting or identification is instead, or additionally, effectuated on a per-word level, wherein one or more words in the call transcript data 132 most predictive of an assigned label or outcome are highlighted or otherwise identified in a digital representation of a call transcript. In one embodiment, server computer 110 may also execute programmed instructions formatted to cause the generation and digital storage in memory 111 of explainability summary data which aggregates or summarizes batches of the explainability data.

In one embodiment, server computer 110 stores corrective data 160 in memory 111. Server computer 110 may execute programmed instructions formatted to generate and/or digitally store the corrective data 160 based on the digitally stored call topics 152 and the digitally stored call classifications 154 as part of a programmed active learning process. For example, server computer 110 may transmit programmed instructions to client computing device 120 formatted to cause display of a prompt in a graphical user interface displayed on device display 180. The prompt may query a user of client computing device 120 to provide feedback on whether one or more call topics 152 or call classifications 154 predicted by server computer 110 are accurate for one or more calls. Responsive to receiving reply input from client computing device 120, server computer 110 may update the classifier model 150 digitally stored in memory 111. In one embodiment, updating the classifier model 150 through an active learning process may occur regularly or automatically as server computer 110 receives feedback input from client computing device 120. In one embodiment, the corrective data 160 represents batches of feedback which may be processed only after a triggering condition is met. For example, responsive to determining at server computer 110, based on a set of feedback input comprising a first feedback input, that a prediction accuracy of the classifier model 150 is below a threshold prediction accuracy, server computer 110 may execute programmed instructions formatted to cause updating the classifier model 150 using the corrective data 160. In some embodiments, a corrective data set can be formed from the corrective data 160 and used to update the classifier model 150 to improve the accuracy of its predictions. In particular embodiments, the aforementioned corrective data set may also include information from one or more new batches of unlabeled calls.

In one embodiment, the server computer generates representation and category data 118 from a plurality of categorized call transcripts. The representation and category data 118 may comprise aggregated information from a plurality of categorized call transcripts. For example, the representation data may identify each of a plurality of thematic elements, average length of time spent on each theme per call, total amount of time spent on each theme, and/or other aggregated information regarding the call transcripts or modeled representations.

In some embodiments, in order to execute the various techniques described in this disclosure, server computer 110 may execute functions defined or specified in one or more code libraries, information of which may be stored in memory 111 or dynamically accessible by server computer 110.

For purposes of illustrating a clear example, FIG. 1 shows a limited number of instances of certain functional elements. However, in other embodiments, there may be any number of such elements. For example, embodiments with multiple client computing devices may include a first client computing device or first plurality of client computing devices which sends the call transcripts to the server computer and a second client computing device or second plurality of client computing devices which receives the representation, outcome, and label data from the server computer. Further, the server computer 110 may be implemented using two or more processor cores, clusters, or instances of physical machines or virtual machines, configured in a discreet location or co-located with other elements in a datacenter, shared computing facility, or cloud computing facility.

3. The Classifier Model

Figure 3A:
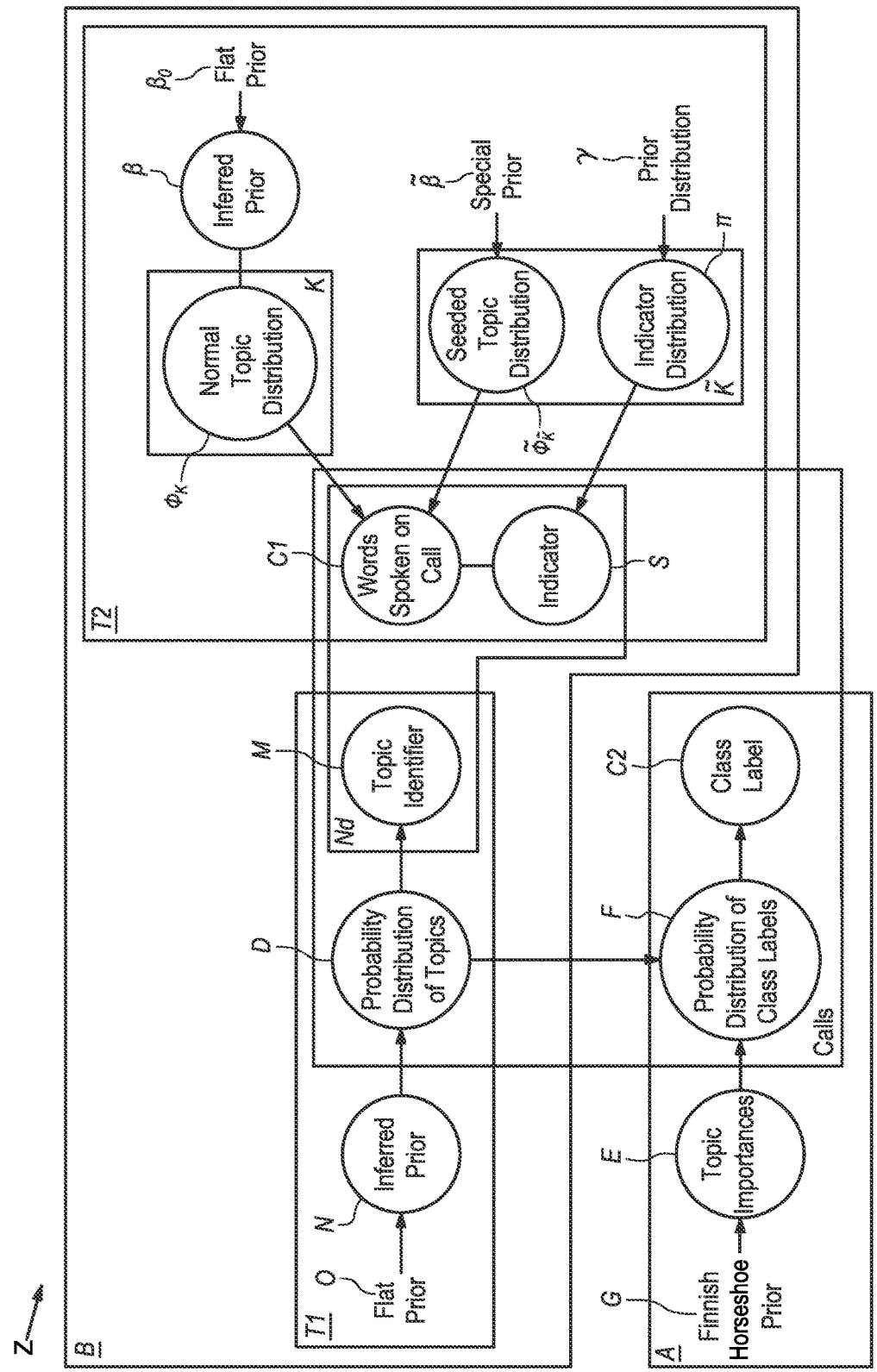
FIG. 3A illustrates an example programmed or computer-implemented classifier model, in one embodiment.

FIG. 3A depicts an example programmed or computer-implemented classifier model Z comprising a classifier A and a feature model B. The classifier A is conjoined with the feature model B. The conjoined models define a joint probability distribution over features internal to the models and the data. Data takes the form of words spoken on the call C1 and class labels C2 (or categories) supplied for each call of a set of calls. If any data C1 or C2 is missing, it may be imputed or marginalized using probability distributions inferred by the model.

In the example shown in FIG. 3A, the classifier A takes the form of a linear model. This model takes, as input, features generated by the feature model B and infers importance values E for each feature for each possible outcome. Features are depicted in FIG. 3A as Probability Distribution of Topics D. The linear model assumes the logarithm of the odds ratio for each outcome is a linear function of the features (D) and topic importance values E. The probability distribution of class labels F can be inferred from this log odds ratio via simple arithmetic. While the depicted example shows a linear model, certain non-linear models may be equally applicable to the method.

Thus, in some embodiments, a non-linear classifier may be used instead of a linear classifier. A non-linear classifier may permit modeling of an exclusive OR, for example, identifying that a call is of a particular class when either a set of words X (many of which are in topic x) or a set of words Y (many of which are in topic y) are discussed on a call, but not when both are discussed on a call. One such non-linear classifier that could be used is a simple feedforward neural network, but many others are possible.

In the example embodiment of FIG. 3, the classifier A uses a Finnish Horseshoe prior G for the topic importance values E. Such a classifier A may be referred to as a Finnish Horseshoe Model, but any classifier A may be used which defines a joint probability distribution F over call features (D) and observed labels C2. Other examples of suitable linear classifiers include the L2 Logistic Regression, and the Logistic Regression using the Horseshoe Potential, and many others are possible.

Some embodiments may use the Finnish Horseshoe prior G to enhance the predictive power of the model and achieve a higher level of model interpretability. Using the Finnish Horseshoe prior G in conjunction with a linear classifier and a feature model B expresses the prior belief that certain features may, or may not, matter to predictions. As opposed to a common machine learning model that implicitly assumes a normal distribution for parameters, this setup explicitly allows for the possibilities of two classes of features, only one of which is important. For example, the weather could be a semi-common topic of small talk on sales calls, the weather topic being associated with words like sunny, rain, lightening, etc. But the existence of words indicating the weather topic on a call might be a poor indicator of whether the call is about scheduling an appointment or is any other particular type of call. The Finnish Horseshoe prior G can account for this.

The graph of FIG. 3A defines an equation which is a joint probability distribution over all of the modeled parameters and all of the data used to train the model. The training data comprises digital representations of spoken words C1, and associated labels C2. As can be seen by the apparent lack of any connection between the words C1 and the classifier branch A of the feature model Z, the graph expresses conditional independence: If the call features (represented here as the Probability Distribution of Topics D) were known, then nothing in the classifier branch A would depend on the spoken words C1. The classifier A instead operates on high-level themes present in the calls S. But because the features (D) are not known, a solution involves conditioning on the data to obtain a posterior distribution over the parameters given the data (C1 and C2). Such conditioning induces dependencies between prediction probabilities F and spoken words C1 due to a statistical phenomenon known as "explaining away." The classifier model Z can thus be trained using word data from call transcripts.

Because the graph of FIG. 3A defines a joint probability distribution over all of the model parameters and all of the data, if any data C1 or C2 is missing it may be marginalized by integrating the missing variables out from this joint distribution. This property allows the model Z defined in FIG. 3A to be trained on incomplete data, in semi-supervised fashion. This property is especially useful because word data C1 is available at low cost and in abundance, while label or category information C2 is expensive and labor-intensive to obtain.

Training a call classification model Z in a semi-supervised fashion, as described herein, allows for the creation of a model that may be much more predictive than models which cannot be trained in semi-supervised fashion. Effectively, unlabeled call data C1 (which is potentially cheap and abundant) can be used to identify thematic elements in the data pertinent to the feature model B, while labeled calls C2 can be used to infer which of those patterns are predictive of desired outcomes. This allows a model Z implemented according to the disclosed technology to potentially train on much smaller datasets than state of the art models, creating an opportunity to use the disclosed technology in diverse settings with reduced expenditure of effort and resources.

4.1 the Feature Model

As noted above, the classifier A discussed in the preceding section 3 does not operate directly in the transcript data C1. Instead, the classifier A operates on high-level features inferred by the feature model B of FIG. 3A. As described herein, the disclosed feature model B generally takes the form of a Bayesian Belief Network based on the hierarchical Pitman-Yor process. In the specific example of FIG. 3A, this Bayesian Belief Network takes the form of an admixture model, otherwise known as a topic model. In this admixture model, topics represent recurring thematic elements in the dataset. Topics can be represented as mixtures of words or probability distributions over words. In the admixture model, calls may be represented as mixtures of topics. Calls can thus be represented as probability distributions over topics D.

In the particular depicted embodiment of FIG. 3A, probability distribution over topics D also defines the features passed to the classifier A, indirectly linking call categories C2 to the spoken words C1. In embodiments where feature model B is a general Bayesian Belief Network, but not an admixture model or topic model, a more general set of features may be passed to the classifier A, indirectly linking call Categories C2 to the spoken words C1.

The models described herein comprise mathematical models which are described at a level sufficient to enable a person of skill in the relevant technical fields to make and use the models without undue experimentation. Generally, the topics comprise probabilistic models for each of the words spoken on every call. These probabilities may be modeled as functions of the topics relevant to the application, the vocabulary associated with each topic, and of how prevalent each topic is.

FIG. 3A depicts an example of a feature model B comprising a topic branch T1 and a word branch T2. As depicted, the topic branch T1 of the topic model and the word branch T2 of this admixture model may be assumed to be conditionally independent. As is described further herein, this assumed conditional independence may be used to create a blocked sampler for topic assignments which allows all of the different model components to be updated at once. The internal details of each component may be updated using, for example, a Gibbs sampler, wherein each component is updated in sequence, conditioned on all the others.

4.1 Topic Pre-Seeding by Keyword Groupings

Notably, the admixture model of the embodiment depicted in FIG. 3A is not a conventional admixture model wherein each topic is automatically generated by the model without regards to any a priori knowledge of topics or themes present in the data set. Instead, the topics of the calls are modeled to comprise a set of pre-seeded topics with $\tilde{K}$ elements and a set of non-pre-seeded topics with $K-\tilde{K}$ elements. This modeling may be accomplished by programmatically pre-seeding the topic model with a set of keyword groups, each keyword group associating a respective set of keywords with a topic of the set of pre-seeded topics. For example, for sales calls, a named "directions" topic can be specified to include the set of keywords {right, left, blocks, past, by, turn, exit}, while a named "appointment" topic can be specified to include the set of keywords {time, schedule, scheduled, arrive, booked, see, calendar, introduce, reminder, meet, visit}.

The embodiment depicted in FIG. 3A models words spoken on a call C1 as being drawn from two distinct types of probability distributions of words. Each word $w_{dn}$ contains an indicator $s_{dn}$ denoting whether that word was drawn from a normal topic distribution $\phi_k$ or a seeded topic distribution $\tilde{\phi}_{\tilde{k}}$, each mixture topic distribution corresponding to one of the keyword groups programmatically pre-seeded into the model. The indicators s take two values, 0 or 1.

The mixture topic distributions take the form $(1-\pi_k)\phi_k + \pi_k\tilde{\phi}_{\tilde{k}}$, where the indicators $s_{dn}$ are drawn from the indicator distribution $\pi$. In one embodiment, $\pi$ is a Bernoulli distribution. As depicted in FIG. 3A, $\gamma$ is a prior distribution for $\pi$ (in other words, $\pi$ is modeled to be drawn from $\gamma$). In one embodiment, $\gamma$ is a Beta distribution, which has two parameters. In other embodiments, $\gamma$ may be a flat prior distribution or another type of prior distribution. In one embodiment, the parameters of $\gamma$ are chosen to skew $\pi$ to preferentially choose a mixture topic distribution over a normal topic distribution when assigning an indicator to a word; but with enough variance such that the model can choose whatever value is needed to fit the data.

In an embodiment, the normal topics $\phi_k$ are modeled as being drawn from an inferred prior distribution $\beta$, which is unknown before training the model. This inferred prior distribution β indicates a lexicon, or an overall probability distribution for words in the dataset as a whole. In an embodiment, the lexicon indicated by prior distribution β may be inferred by the feature model B from an assumed uniform distribution $β_0$. Notably, however, said detail is not essential to the model Z; for example, replacing the uniform distribution $β_0$ with an empirical distribution derived from the training data is also applicable. Many other possibilities are equally applicable.

In an embodiment, the seeded topics $\tilde{φ}_{\tilde{k}}$ are modeled as being drawn from a special prior distribution $\tilde{β}$ which is nonzero only for the keywords of the keyword groups programmatically pre-seeded into the model. Using this special prior distribution is what effectively allows, for example, a first topic to be specified to include the set of keywords {right, left, blocks, past, by, turn, exit} and a second topic to be specified to include the set of keywords {time, schedule, scheduled, arrive, booked, see, calendar, introduce, reminder, meet, visit}, as previously described herein. However, this would not preclude any of the aforementioned words from appearing in other topics, because feature model B may allow words to have multiple distinct meanings based on its programming. Moreover, the mixture distribution has support over all words, allowing for words to be present in a topic, even if they were not specified in the list of keywords Thus far, the word branch T2 of feature model B has been described. But feature model B also presumes that each word is associated with one of a multiplicity of topics, or themes. Thus, feature model B must also determine to which theme each word is associated, which is accomplished in the topic branch T1 of feature model B. FIG. 3A indicates modeling this determination using the topic identifier M. The topic identifier M is a tag associated with each spoken word, indicating which of the abstract themes H that word is associated with. In an embodiment, the topic identifier M is assumed to be a variable z drawn from a per-call probability distribution D over topics, which is modeled hierarchically. The model thus defines a joint distribution on {z, w, s} for each word in the dataset.

In an embodiment, the multiplicity of distributions D may each be assumed to be drawn from an unknown prior distribution N, which is inferred by the model. In an embodiment, the prior distribution N represents the corpus-wide prevalence of each of the topics K modeled by H, and is assumed to be drawn from a uniform prior over topics O. But this detail is not essential to the model; replacing the uniform distribution O with, e.g., a power-law or other distribution may be equally valid.

The high-level topics $φ_k$ and $(1-π_k)φ_k+π_k\tilde{φ}_{\tilde{k}}$ may represent recurring themes present in the dataset. In an embodiment, the distribution N indicates, on a corpus level, how prevalent each of these themes are. The distributions $φ_k$, $(1-π_k)φ_k+π_k\tilde{φ}_{\tilde{k}}$, and N may therefore represent a corpus-level summary of the data. The per-call distributions D may specialize this information to each individual call. In effect, D may provide a high-level, abstract summary for each call of a set of calls. In an embodiment, this is the information passed to the classifier A of FIG. 3A. In an embodiment, because the feature model B and classifier A are trained concurrently, the feature model B learns to obtain features (D) which not only summarize each call of a set of calls, but which are also highly predictive of call categories. In this way, the feature model B may be directed by the classifier A.

In an embodiment, a hierarchical feature model B thus entails deriving progressively more specialized probability distributions from more general distributions. In embodiments, the process of modeling distributions over probability distributions may be accomplished with the Pitman-Yor Process. Although embodiments may model this process in another way, such as by using a Dirichlet distribution, Dirichlet process, or other nonparametric prior process, the Pitman-Yor process may be more flexible and better suited to language than the Dirichlet distribution, which may be used for an ordinary topic model such as the Latent Dirichlet allocation (LDA) model. For instance, the Pitman-Yor process can model power-law distributions which better match distributions of words in language, thus providing more accurate and more efficient models.

Figure 3B:
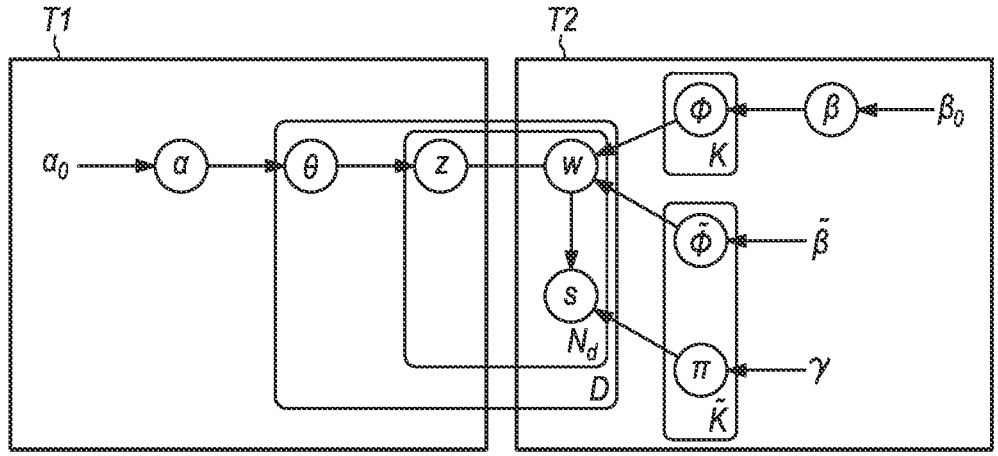
FIG. 3B illustrates an example programmed or computer-implemented machine learning statistical topic model without speaking party segregation, in one embodiment.

FIG. 3B depicts one embodiment of the feature model B of FIG. 3A comprising a topic branch T1 and a word branch T2. The topic branch T1 culminates in the topic identifiers z which are drawn from the probability distribution of topics θ, which is drawn from an inferred prior α, which is drawn from a flat prior $α_0$. The topic branch culminates in the spoken words w, which are drawn from the mixture topic distributions $(1-π_k)φ_k+π_k\tilde{φ}_{\tilde{k}}$. Such mixture distributions are comprised of seeded topics $\tilde{φ}_{\tilde{k}}$, which are drawn from the special prior $\tilde{β}$, and normal topic distributions $φ_k$, which are drawn from the inferred prior β, which is drawn from the flat prior $β_0$. There are also non-mixture topics, which contain only the normal topic distributions $φ_k$. Each word w is associated with an indicator s, which is drawn from indicator distribution π, which is drawn from prior distribution γ. As previously explained, the special prior $\tilde{β}$ is nonzero only for the keywords of the keyword groups programmatically pre-seeded into the model.

4.2. Speaking Party Segregation

Figure 3C:
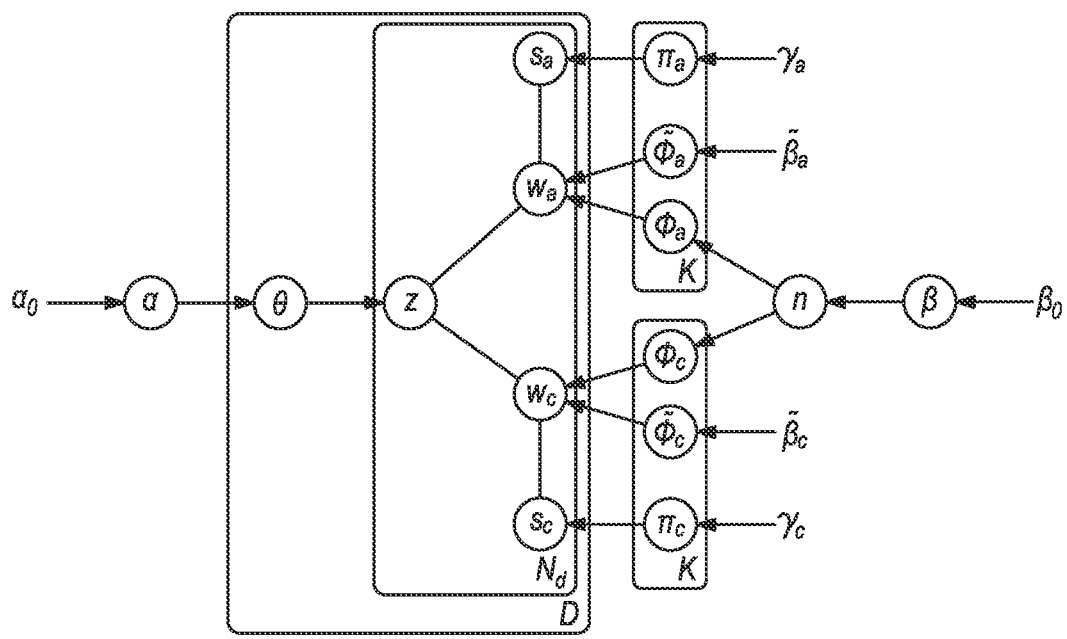
FIG. 3C illustrates an example programmed or computer-implemented machine learning statistical topic model with speaking party segregation, in one embodiment.

FIG. 3C depicts another embodiment of feature model B (FIG. 3A), the embodiment of FIG. 3C being programmed for speaking party segregation. In various embodiments, feature model B may be restricted to predict based on the high-level thematic information by explicitly modeling certain types of variability in the topics. This allowance may prevent the model from implicitly modeling variability by spawning duplicate topics. In one embodiment, call transcripts or digital data representing words spoken on calls are programmatically divided into first person type data spoken by a first person type on the call and second person type data spoken by a second person type on the call. For example, the first person and second person types may be "agent" and "caller," but there are many other possibilities. In other embodiments, the words are split among two, three, four, or more speaking parties of various types.

In the embodiment of FIG. 3C, feature model B explicitly models "agent" and "caller" variants of the seeded distribution topics $\tilde{φ}_{\tilde{k}}$ as $\tilde{φ}_a$ and $\tilde{φ}_c$ respectively and of the normal distribution topics $φ_k$ as $φ_a$ and $φ_c$ respectively. In this embodiment, each of $φ_a$ and $φ_c$ are independently derived from high-level topics modeled by η, while $\tilde{φ}_a$ and $\tilde{φ}_c$ are each modeled as being drawn from special priors $\tilde{β}_a$ and $\tilde{β}_c$ respectively, which operate like the special prior $\tilde{β}$ from the embodiments of FIG. 3A and FIG. 3B, but may be specialized for each speaking party. Thus, the embodiment of FIG. 3C essentially comprises two words branches, components of which share a common prior at η. These two branches respectively culminate in the agent spoken words $w_a$ and the caller spoken words $w_c$. This handling prevents differences between the caller and agent sides of the conversation from influencing the high-level topics modeled by η. Further, η is modeled as being drawn from the inferred prior β, which is drawn from the flat prior $β_0$.

In the embodiment of FIG. 3C, the agent words $w_a$ each contain an indicator $s_a$ denoting whether that word was drawn from a seeded topic distribution $\tilde{\phi}_a$ or from a normal topic distribution $\phi_a$. Similarly, the caller words $w_c$ each contain an indicator $s_c$ denoting whether that word was drawn from a seeded topic distribution $\tilde{\phi}_c$ or a normal topic distribution $\phi_c$. As in the other embodiments, each seeded topic distribution corresponds to one of the keyword groups programmatically pre-seeded into the model and the indicators s take two values, 0 or 1. The agent-side indicators $s_a$ are drawn from the agent-side indicator distribution $\pi_a$ which is drawn from prior distribution $\gamma_a$. Similarly, the caller-side indicators $s_c$ are drawn from the caller-side indicator distribution $\pi_c$ which is drawn from prior distribution $\gamma_c$.

As in the embodiment of FIG. 3B, in the embodiment of FIG. 3C, a topic branch culminates in the topic identifiers z which are drawn from the probability distribution of topics θ, which is drawn from an inferred prior α, which is drawn from a flat prior $α_0$.

4.3 Extensions

In the discussion of FIG. 3A thus far, it has been assumed that each distribution applies to individual words; this assumption is often called the "bag of words" approximation in natural language processing. But this assumption is not required by feature model B; the descriptions of this disclosure may apply equally to distributions over pairs, triplets, or higher-order combinations of words, without modification.

In effect, the word branch(es) of feature model B could also model phrases instead of words. And the topic branch of feature model B could also model transition probabilities among topics in addition to their marginal probabilities. Such embodiments might increase the dimensionality of the data, and thus the computational power needed to process it, but would not require a different underlying methodology.

In an embodiment, extra layers of hierarchy could be introduced in the model to handle sequences of words, for example, a probability distribution over three-word phrases P(w1, w2, w3)=P(w1) P(w2|w1) P(w3|w1, w2). In such an embodiment, each of the three terms is a single probability distribution over words and thus has the same mathematical form as any object on a word branch of the feature model B. The conditional dependencies may then represent the same mathematical relationship as between adjacent layers of the graph in FIG. 3A. Thus, straightforward modifications to the Bayesian Belief Network in FIG. 3A, without any changes to the underlying methodology, can accommodate a wide range of aspects of the data, as needed.

5. Sampling Algorithm for the Conjoined Model

In an embodiment, the combined classifier model Z shown in FIG. 3A represents a joint probability distribution $P(v_A, v_B, \mathcal{D})$ over the components $v_A$ internal to the classifier A, the components $v_B$ internal to the feature model B, and the data $\mathcal{D}$. Given an observed dataset $\mathcal{D}$, we want to obtain the posterior probability distribution $P(v_A, v_B | \mathcal{D})$ over parameters internal to the model. If the components $v_A$ internal to the classifier A can be written as a conjunction of call labels $\ell$ and remaining components $\widetilde{v_A}$, then in order to make predictions, we want the marginal distribution over labels $$P(\ell | \mathcal{D}) = \int_{\widetilde{v_A}} \int_{v_B} P(v_A, v_B | \mathcal{D}).$$

While these posterior probability distributions are difficult to obtain exactly for the model shown in FIG. 3A, they may be obtained approximately by using Markov Chain Monte Carlo (MCMC). An MCMC algorithm can be used for the model shown in FIG. 3A. According to the Metropolis-Hastings theorem, samples from the joint distribution $P(v_A, v_B | \mathcal{D})$ can be approximated by alternately sampling from the conditional distributions $P(v_A | v_B, \mathcal{D})$ and $P(v_B | v_A, \mathcal{D})$. This process is known as a Gibbs sampler, and represents what may be considered the highest-level step in a sampling algorithm of embodiments. The entire process of updating the model, as described, can be considered a form of Rao-Blackwellization. The following sections of this disclosure detail an example algorithm for each of these conditional distributions.

5.1 Sampling Algorithm for the Classifier

As shown in FIG. 3A, the classifier A may be independent of most of the data and all other aspects of the feature model if conditioned on the call features (modeled as D, in an embodiment). In an embodiment, sampling from the conditional distribution $P(v_A | v_B, \mathcal{D})$ therefore reduces to sampling from $P(v_A | D, C2)$, and classifier A may be trained as would an ordinary classifier.

An embodiment may use a Hamiltonian Monte Carlo sampler for this purpose because of its efficiency, its short correlation length, and its ability to perform in high-dimensional spaces. But any other MCMC technique may be equally applicable.

5.2 Sampling Algorithm for the Feature Model

As shown in FIG. 3B, the feature model B may consist of two conditionally-independent branches: the word branch T2, beginning at $β_0$, $\tilde{β}$, and γ and culminating at w, and the topic branch T1, beginning at $α_0$ and culminating at z. The conditional probability $P(v_A, v_B | \mathcal{D})$ therefore factors into two terms, one representing each branch: $P(v_A, v_B | \mathcal{D}) = P(v_J | \mathcal{D}) \times P(v_O | v_A, \mathcal{D})$ where $v_J$ and $v_O$ represent variables internal to the word branch T2 and topic branch T1, respectively.

Due to the conditional independence implied by the graph in FIG. 3B, the conditional distribution $P(v_A, v_B | \mathcal{D})$ simplifies to $P(w, z, s, θ, α, φ, \tilde{φ}, π, β | α_0, β_0, \tilde{φ}, γ)$, which factors as follows:

$$= \left( P(α|α_0) \times \prod_d \left[ P(θ_d|α) \prod_k θ_{dk}^{c_{dk}^θ} \right] \right)$$
$$\times \left( P(β|β_0) \times \prod_k \left[ P(φ_k|β) \prod_v θ_{kv}^{c_{kv}^φ} \right] \right)$$
$$\times \prod_{\tilde{k}} \left[ P(\tilde{φ}_{\tilde{k}} | \tilde{β}) \prod_v \tilde{φ}_{\tilde{k}v}^{c_{\tilde{k}v}^{\tilde{φ}}} \right]$$
$$\times \prod_{\tilde{k}} \left[ P(π_{\tilde{k}} | γ) \prod_v \tilde{φ}_{\tilde{k}v}^{c_{\tilde{k}v}^π} \right]$$
$$\overline{\Delta}$$

= equation (1b)

Given that the distributions α, θ, φ, β, and $\tilde{φ}$ are unknown, the distributions are described in terms of customer counts c, representing tallies of data within the distribution, which are partitioned into a set of latent counts called table counts t which represent the fraction of the customer counts which get passed up the hierarchy to inform the parent distribution, i.e. the number of customer counts that show up in the parent node or $c_k^α \equiv \sum_d t_{dk}^θ$. Using customer and table counts, the probability distribution over model parameters may be expressed as:

$$= \frac{P(c^θ, t^θ, c^α, t^α | α_0) \times P(c^φ, t^φ, c^β, t^β | β_0) \times P(c^{\tilde{φ}}, t^{\tilde{φ}}, |\tilde{β}) \times P(c^π | γ)}{\Delta}$$

Following the Pitman-Yor statistics for these terms, each term may be written as:

$$P(c^\theta, t^\theta, c^\alpha, t^\alpha | \alpha_0) = f^\theta f^\alpha f^{\alpha_0} = \left[ \prod_d \left[ \frac{(b^\theta | a^\theta)_{T_d^\theta}}{(b^\theta)_{C_d^\theta}} \prod_K \frac{S_{t_{d,k}^\theta}^{c_{d,k}^\theta}}{H_{t_{d,k}^\theta}^{c_{d,k}^\theta}} \right] \right]$$

$$\left[ \frac{(b^\alpha | a^\alpha)_{T^\alpha}}{(b^\alpha)_{C^\alpha}} \prod_K \frac{S_{t_k^\alpha}^{c_k^\alpha}}{H_{t_k^\alpha}^{c_k^\alpha}} \right] \left[ \prod_K \alpha_{0_k}^{c_k^{\alpha_0}} \right] = \text{equation (2a)}$$

The term S is an unsigned Stirling number of the first kind. The terms a and b are parameters of the Pitman-Yor process known as the discount and concentration, respectively. They may be considered fixed values or sampled using any known sampling technique. The function H is the choose function, also known as the binomial coefficient. The terms C and T are summations of the customer and table counts, respectively. Thus, $C \equiv \Sigma_k c_k$ and $T \equiv \Sigma_k t_k$. The terms $(b|a)_T$ and $(b)_c$ are Pochhammer symbols that have the identity of:

$$(b|a)_T \equiv b(b+a)(b+2a) \ldots (b+(T-1)a)$$

$$(b)_c \equiv b(b+1)(b+2) \ldots (b+C-1).$$

The terms $P(c^\phi, t^\phi, c^\beta, t^\beta | \beta_0)$ and $P(c^{\tilde{\phi}}, t^{\tilde{\phi}} | \tilde{\beta})$ can be written analogously:

$$P(c^\phi, t^\phi, c^\beta, t^\beta | \beta_0) = f^\phi f^\beta f^{\beta_0} = \left[ \prod_K \left[ \frac{(b^\phi | a^\phi)_{T_k^\phi}}{(b^\phi)_{C_k^\phi}} \prod_V \frac{S_{t_{k,v}^\phi}^{c_{k,v}^\phi}}{H_{t_{k,v}^\phi}^{c_{k,v}^\phi}} \right] \right]$$

$$\left[ \frac{(b^\beta | a^\beta)_{T^\beta}}{(b^\beta)_{C^\beta}} \prod_V \frac{S_{t_v^\beta}^{c_v^\beta}}{H_{t_v^\beta}^{c_v^\beta}} \right] \left[ \prod_V \beta_{0_v}^{c_v^{\beta_0}} \right] = \text{equation (2b)}$$

$$P(c^{\tilde{\phi}}, t^{\tilde{\phi}} | \tilde{\beta}_0) = f^{\tilde{\phi}} f^{\tilde{\beta}} = \left[ \prod_{\tilde{K}} \left[ \frac{(b^{\tilde{\phi}} | a^{\tilde{\phi}})_{T_{\tilde{k}}^{\tilde{\phi}}}}{(b^{\tilde{\phi}})_{C_{\tilde{k}}^{\tilde{\phi}}}} \prod_V \frac{S_{t_{\tilde{k},v}^{\tilde{\phi}}}^{c_{\tilde{k},v}^{\tilde{\phi}}}}{H_{t_{\tilde{k},v}^{\tilde{\phi}}}^{c_{\tilde{k},v}^{\tilde{\phi}}}} \right] \right] \left[ \prod_{\tilde{K}} \prod_V \tilde{\beta}_{0_{\tilde{k}v}}^{c_{\tilde{k}v}^{\tilde{\beta}_0}} \right] =$$

equation (2c)

Looking at the term $\Delta$ to handle $\pi$, the resulting expression is, where the last term uses Pochhamer symbols:

$$\int_\pi \prod_{\tilde{k}} \left[ P(\pi_{\tilde{k}} | \gamma) \prod_v \pi_{\tilde{k}v}^{c_{\tilde{k}v}^\pi} \right] d\pi = \int_{\pi_1} \int_{\pi_2} \ldots$$

$$\int_{\pi_{\tilde{k}}} \frac{\Gamma(\gamma_0 + \gamma_1)}{\Gamma(\gamma_0)\Gamma(\gamma_1)} \pi_{\tilde{k}}^{\gamma_1 + C_{\tilde{k}}^{\tilde{\phi}} - 1} (1 - \pi_{\tilde{k}})^{\gamma_0 + C_{\tilde{k}}^\phi - 1} d\pi_1 d\pi_2 \ldots d\pi_{\tilde{K}} =$$

-continued $$\prod_{\tilde{k}} \frac{\Gamma(\gamma_1 + C_{\tilde{k}}^{\tilde{\phi}}) \Gamma(\gamma_0 + C_{\tilde{k}}^\phi)}{\Gamma(\gamma_0)\Gamma(\gamma_1)} \frac{\Gamma(\gamma_0 + \gamma_1)}{\Gamma(\gamma_0 + \gamma_1 + C_{\tilde{k}}^{\tilde{\phi}} + C_{\tilde{k}}^\phi)} =$$

$$\prod_{\tilde{k}} \frac{(\gamma_1) C_{\tilde{k}}^{\tilde{\phi}} (\gamma_0) C_{\tilde{k}}^\phi}{(\gamma_0 + \gamma_1) C_{\tilde{k}}^\phi + C_{\tilde{k}}^{\tilde{\phi}}}$$

To make a Gibbs sampler, a joint distribution over the assignments for each word is needed. One may define:

$$P(z_{dn}, w_{dn}, s_{dn}, u_{dn}^\theta, u_{dn}^\phi, u_{dn}^{\tilde{\phi}}, u_{dn}^\alpha, u_{dn}^\beta | z_{\neg dn},$$

$$w_{\neg dn}, s_{\neg dn}, \{\vec{u}\}_{\neg dn}, \alpha_0, \beta_0, \gamma\tilde{\beta}) \equiv P(z_{dn}, w_{dn},$$

$$s_{dn}, \{\vec{u}\}_{dn} | z_{\neg dn}, w_{\neg dn}, s_{\neg dn}, \{\vec{u}\}_{\neg dn}, \mathcal{P}) = \frac{P(z, w, s, \{\vec{u}\} | \mathcal{P})}{P(z_{\neg dn}, w_{\neg dn}, s_{\neg dn}, \{\vec{u}\}_{\neg dn} | \mathcal{P})} =$$

$$R^{\alpha_0} R^\alpha R^\theta [R^{\beta_0} R^\beta R^\phi]^{I(s_{dn}=0)} [R^{\tilde{\beta}} R^{\tilde{\phi}}]^{I(s_{dn}=1)} \times$$

$$\left[ \frac{(\gamma_0 + C_{\tilde{k}}^\phi)^{I(s_{dn}=0)} (\gamma_1 + C_{\tilde{k}}^{\tilde{\phi}})^{I(s_{dn}=1)}}{\gamma_0 + \gamma_1 + C_{\tilde{k}}^\phi + C_{\tilde{k}}^{\tilde{\phi}}} \right] =$$

$$\left[ \frac{R^{\alpha_0} R^\alpha R^\theta}{\gamma_0 + \gamma_1 + C_{\tilde{k}}^\phi + C_{\tilde{k}}^{\tilde{\phi}}} \right] \times [R^{\beta_0} R^\beta R^\phi (\gamma_0 + C_{\tilde{k}}^\phi)]^{I(s_{dn}=0)} \times$$

$$[R^{\tilde{\beta}} R^{\tilde{\phi}} (\gamma_1 + C_{\tilde{k}}^{\tilde{\phi}})]^{I(s_{dn}=1)} = \text{equation (3d)}$$

Where u may be a Boolean indicator may be denoting whether or not a data point created a new table count:

$$t_k = \sum_{n=1}^{c_k} u_{n,k}.$$

The R-terms are defined as ratios of the f-terms defined in equations (2a), (2b), and (2c). E.g., $$R^\theta = \frac{f^\theta}{f_{\neg dn}^\theta},$$

where $f^\theta_{\neg dn}$ defined as $f^\theta$ with the current word (word n of call d) removed.

Equation 3d defines a distribution over all parameters for the word dn. One may sample from equation 3d by conditioning and marginalizing out the parameters until a univariate distribution is reached. Then one may sample from the univariate distribution, condition the distribution, and back way up the tree, as follows.

First, a distribution over $\{w, z, s\}$ is obtained by summing out the u-terms:

$$P(z_{dn}, w_{dn}, s_{dn} \mid z_{\neg dn}, w_{\neg dn}, s_{\neg dn}, \{\vec{u}\}_{\neg dn}, \mathcal{P}) = \quad (4a)$$

$$\sum_{\{\vec{u}\}_{dn}} P(z_{dn}, w_{dn}, s_{dn}, \{\vec{u}\}_{dn} \mid z_{\neg dn}, w_{\neg dn}, s_{\neg dn}, \{\vec{u}\}_{\neg dn}, \mathcal{P}) =$$

$$\left[\frac{\left(\sum_{u^\alpha, u^\theta} R^{\alpha_0} R^\alpha R^\theta\right)}{\gamma_0 + \gamma_1 + C_k^\phi + C_k^{\tilde\phi}}\right] \times$$

$$\left[\left(\sum_{u^\beta, u^\phi} R^{\beta_0} R^\beta R^\phi\right)\left(\gamma_0 + C_k^\phi\right)\right]^{\mathbb{1}(s_{dn}=0)} \times$$

$$\left[\left(\sum_{u^{\tilde\phi}} R^{\tilde\beta} R^{\tilde\phi}\right)\left(\gamma_1 + C_k^{\tilde\phi}\right)\right]^{\mathbb{1}(s_{dn}=1)}$$

$$\equiv p_\theta p_\phi^{\mathbb{1}(s=0)} p_{\tilde\phi}^{\mathbb{1}(s=1)} \qquad \text{equation (4b)}$$

Next, s may be marginalized out:

$$P(z_{dn}, w_{dn} \mid z_{\neg dn}, w_{\neg dn}, s_{\neg dn}, \{\vec{u}\}_{\neg dn}, \mathcal{P}) =$$

$$\sum_{s_{dn}} P(z_{dn}, w_{dn}, s_{dn} \mid z_{\neg dn}, w_{\neg dn}, s_{\neg dn}, \{\vec{u}\}_{\neg dn}, \mathcal{P}) p_\theta(p_\phi + p_{\tilde\phi}) = \text{equation (5b)}$$

This distribution may be conditioned on an observed word so that equation (5b) may be used to sample for the topic assignment $z_{dn}$:

$$P(z_{dn} \mid z_{\neg dn}, w, s_{\neg dn}, \{\vec{u}\}_{\neg dn}, \mathcal{P}) =$$

$$\frac{P(z_{dn}, w_{dn} \mid z_{\neg dn}, w_{\neg dn}, s_{\neg dn}, \{\vec{u}\}_{\neg dn}, \mathcal{P})}{\sum_k P(z_{dn} = k, w_{dn} \mid z_{\neg dn}, w_{\neg dn}, s_{\neg dn}, \{\vec{u}\}_{\neg dn}, \mathcal{P})} \propto$$

$$P(z_{dn}, w_{dn} \mid z_{\neg dn}, w_{\neg dn}, s_{\neg dn}, \{\vec{u}\}_{\neg dn}, \mathcal{P})$$

Next, the mixture component $s_{dn}$ may be sampled for using equation (4b) and equation (5b):

$$P(s_{dn}, \mid z, w, s_{\neg dn}, \{\vec{u}\}_{\neg dn}, \mathcal{P}) =$$

$$\frac{P(z_{dn}, w_{dn}, s_{dn} \mid z_{\neg dn}, w_{\neg dn}, s_{\neg dn}, \{\vec{u}\}_{\neg dn}, \mathcal{P})}{P(z_{dn}, w_{dn} \mid z_{\neg dn}, w_{\neg dn}, s_{\neg dn}, \{\vec{u}\}_{\neg dn}, \mathcal{P})} =$$

$$\frac{p_\theta p_\phi^{\mathbb{1}(s=0)} p_{\tilde\phi}^{\mathbb{1}(s=1)}}{p_\theta(p_\phi p_{\tilde\phi})} = \frac{p_{\phi,k}^{\mathbb{1}(s=0)} p_{\tilde\phi,k}^{\mathbb{1}(s=1)}}{p_{\phi,k} + p_{\tilde\phi,k}} = \text{equation (7b)},$$

equation (7b), which is a Bernoulli distribution.

Thus, sampling for the feature model B of FIG. 3B may progress by (1) decrementing, or removing the current word from the model (2) sampling $z_{dn}$ using equation (5b), sampling $s_{dn} \mid z_{dn}$ using equation 7b, (4) selecting which word branch ($\phi$ or $\tilde\phi$) is "active" according to $s_{dn}$, and (5) sampling for the indicators variables u using equations (2a), (2b), and (2c), making use of the fact that, for any node $\mathcal{N}$, the counts $t^\mathcal{N} = t^\mathcal{N}_{\neg dn} + u^\mathcal{N}$. In other words, the counts t in the equations defined in (2a), (2b), and (2c) are the counts from the decremented state, plus the indicator variable u. Thus, the equations (2a), (2b), and (2c) define simple probability distributions over the indicator variables u, from which they can be sampled.

5.3 Sampling Algorithm for the Feature Model with Speaking Party Segregation

Sampling for the feature model of FIG. 3C, which includes speaking party segregation, follows a similar process. The corresponding joint probability distribution is:

$$P\big(w, z, s_a, s_c, \theta, \alpha, \phi_a, \phi_c, \tilde\phi_a,$$

$$\tilde\phi_c, \pi_a, \pi_c, \eta, \beta \mid \alpha_0, \beta_0, \tilde\beta_a, \tilde\beta_c, \gamma_a, \gamma_c, m\big) =$$

$$\prod_d P(\theta_d \mid \alpha) * \prod_k (\phi_k^{(a)} \mid \eta P) * \prod_k P(\phi^{(a)}k \mid \eta) *$$

$$\prod_k P(\eta_k \mid \beta) \times \prod_{\tilde k} P\big(\tilde\phi_{\tilde k}^{(a)} \mid \tilde\beta^{(a)}\big) * \prod_{\tilde k} P\big(\tilde\phi_{\tilde k}^{(c)} \mid \tilde\beta^{(c)}\big) *$$

$$\prod_{\tilde k} P\big(\pi^{(a)}\tilde k \mid \gamma^{(a)}\big) * \prod_{\tilde k} P\big(\pi^{(c)}\tilde k \mid \gamma^{(c)}\big) \times$$

$$P(\beta \mid \beta_0) P(\alpha \mid \alpha_0) \times \prod_d \prod_{n_d} [P(z_{dn} \mid \theta_d)] \times$$

$$\prod_d \prod_{n_d} \left[\left[P\big(s_{dn}^{(a)} \mid \pi^{(a)}, z_{dn}\big) P\big(w_{dn}^{(a)} \mid \phi^{(a)}, z_{dn}\big)^{\mathbb{1}(s_{dn}^{(a)}=1)}\right.\right.$$

$$\left.\left.P\big(w_{dn}^{(a)} \mid \tilde\phi^{(a)}, z_{dn}\big)^{\mathbb{1}(s_{dn}^{(a)}\neq 1)}\right]^{\mathbb{1}(m_{dn}=a)}\right] \times$$

$$\prod_d \prod_{n_d} \left[\left[P\big(s_{dn}^{(c)} \mid \pi^{(c)}, z_{dn}\big) P\big(w_{dn}^{(c)} \mid \phi^{(c)}, z_{dn}\big)^{\mathbb{1}(s_{dn}^{(a)}=1)}\right.\right.$$

$$\left.\left.P\big(w_{dn}^{(c)} \mid \tilde\phi^{(c)}, z_{dn}\big)^{\mathbb{1}(s_{dn}^{(c)}\neq 1)}\right]^{\mathbb{1}(m_{dn}=c)}\right] =$$

$$\prod_d \left[P(\theta_d \mid \alpha) \prod_k \theta_{dk}^{c_{dk}^\theta}\right] \times \prod_k \left[P(\eta_k \mid \beta) \prod_v \eta_{kv}^{c_{kv}^\eta}\right] \times$$

$$\prod_k \left[P(\phi_k^{(a)} \mid \eta) \prod_v \phi_{kv}^{(a) c_{kv}^{\phi^{(a)}}}\right] \times$$

$$\prod_k \left[P(\phi_k^{(c)} \mid \eta) \prod_v \phi_{kv}^{(c) c_{kv}^{\phi^{(c)}}}\right] \times$$

$$\prod_{\tilde k} \left[P\big(\tilde\phi_{\tilde k}^{(a)} \mid \tilde\beta^{(a)}\big) \prod_v \tilde\phi_{\tilde k v}^{(a) c_{\tilde k v}^{\tilde\phi^{(a)}}}\right] \times$$

$$\prod_{\tilde k} \left[P\big(\tilde\phi_{\pi_{\tilde k}}^{(c)} \mid \tilde\beta^{(c)}\big) \prod_v \tilde\phi_{\tilde k v}^{(c) c_{\tilde k v}^{\tilde\phi^{(a)}}}\right] \times$$

$$\prod_{\tilde k} \left[P\big(\pi_{\tilde k}^{(a)} \mid \gamma^{(a)}\big) \prod_v \pi_{\tilde k v}^{(a) c_{\tilde k v}^{\pi^{(a)}}}\right] \prod_{\tilde k} \left[P\big(\pi_{\tilde k}^{(c)} \mid \gamma^{(c)}\big) \prod_v \pi_{\tilde k v}^{(c) c_{\tilde k v}^{\pi^{(c)}}}\right] \times$$

$$P(\beta \mid \beta_0) P(\alpha \mid \alpha_0)$$

The terms $\theta$, $\phi^{(a)}$, $\phi^{(c)}$, $\tilde\phi^{(a)}$, $\tilde\phi^{(c)}$, $\eta$, $\alpha$, $\beta$ and $\pi$ are integrated out of this joint probability to obtain a marginal probability over the counts. Since equation 1b factors, $\theta$, $\phi^{(a)}$, $\phi^{(c)}$, $\tilde\phi^{(a)}$, $\tilde\phi^{(c)}$, $\eta$, $\alpha$ and $\beta$ can all be integrated similarly as in the non-speaking party segregated version; only $\pi^{(a)}$ and $\pi^{(c)}$ need consideration.

Looking at the terms $$\prod_{\tilde k} \left[P\big(\pi_{\tilde k}^{(a)} \mid \gamma^{(a)}\big) \prod_v \pi_{\tilde k v}^{(a) c_{\tilde k v}^{\pi^{(a)}}}\right] \prod_{\tilde k} \left[P\big(\pi_{\tilde k}^{(c)} \mid \gamma^{(c)}\big) \prod_v \pi_{\tilde k v}^{(c) c_{\tilde k v}^{\pi^{(c)}}}\right],$$

the next transformation provides:

$$\int_{\pi} \prod_{\tilde{k}} \left[ P(\pi_{\tilde{k}} | \gamma) \prod_v \pi_{\tilde{k}v}^{c_{\tilde{k}v}^{\pi}} \right] d\pi =$$

$$\int_{\pi_1} \int_{\pi_2} \cdots \int_{\pi_{\tilde{K}}} \frac{\Gamma(\gamma_0+\gamma_1)}{\Gamma(\gamma_0)\Gamma(\gamma_1)} \pi_{\tilde{k}}^{\gamma_1 + C_{\tilde{k}}^{\tilde{\phi}} - 1} (1-\pi_{\tilde{k}})^{\gamma_0 + C_{\tilde{k}}^{\phi} - 1} d\pi_1 d\pi_2 \ldots d\pi_{\tilde{K}} =$$

$$\prod_{\tilde{k}} \frac{\Gamma(\gamma_1 + C_{\tilde{k}}^{\tilde{\phi}})\Gamma(\gamma_0 + C_{\tilde{k}}^{\phi})}{\Gamma(\gamma_0)\Gamma(\gamma_1)} \frac{\Gamma(\gamma_0 + \gamma_1)}{\Gamma(\gamma_0 + \gamma_1 + C_{\tilde{k}}^{\tilde{\phi}} + C_{\tilde{k}}^{\phi})} = \prod_{\tilde{k}} \frac{(\gamma_1)_{C_{\tilde{k}}^{\tilde{\phi}}} (\gamma_0)_{C_{\tilde{k}}^{\phi}}}{(\gamma_0 + \gamma_1)_{C_{\tilde{k}}^{\phi} + C_{\tilde{k}}^{\tilde{\phi}}}}$$

—where the last term uses Pochhammer symbols. To make a Gibbs sampler, a joint distribution over assignments for each word is needed. The notation may be cleaned up by defining:

$$P\left(z_{dn}, w_{dn}, s_{dn}, u_{dn}^{\theta}, u_{dn}^{\phi}, u_{dn}^{\tilde{\phi}}, u_{dn}^{\alpha}, u_{dn}^{\beta} \middle| z_{\neg dn}, w_{\neg dn}, s_{\neg dn}, \{\vec{u}\}_{\neg dn}, \alpha_0,\right.$$

$$\left. \beta_0, \gamma\vec{\beta} \right) = \frac{P(z, w, s, \{\vec{u}\}|\mathcal{P})}{P(z_{\neg dn}, w_{\neg dn}, s_{\neg dn}, \{\vec{u}\}_{\neg dn}|\mathcal{P})} = [R^{\alpha_0} R^{\alpha} R^{\theta}] \times$$

$$\left[ \frac{\left[R^{\beta_0} R^{\alpha} R^{\eta} R^{\phi^{(a)}}\left(\gamma_0^{(a)} + C_k^{\phi^{(a)}}\right)\right]^{\mathbb{I}(s_{dn}^{(a)}=0)} \times \left[R^{\tilde{\beta}^{(a)}} R^{\tilde{\phi}^{(a)}}\left(\gamma_1^{(a)} + C_k^{\tilde{\phi}^{(a)}}\right)\right]^{\mathbb{I}(s_{dn}^{(a)}=1)}}{\gamma_0^{(a)} + \gamma_1^{(a)} + C_k^{\phi^{(a)}} + C_k^{\tilde{\phi}^{(a)}}} \right]^{\mathbb{I}(m_{dn}=a)} \times$$

$$\left[ \frac{\left[R^{\beta_0} R^{\beta} R^{\eta} R^{\phi^{(c)}}\left(\gamma_0^{(c)} + c_k^{\phi^{(c)}}\right)\right]^{\mathbb{I}(s_{dn}^{(c)}=0)} \times \left[R^{\tilde{\beta}^{(c)}} R^{\tilde{\phi}^{(c)}}\left(\gamma_1^{(c)} + C_k^{\tilde{\phi}^{(c)}}\right)\right]^{\mathbb{I}(s_{dn}^{(c)}=1)}}{\gamma_0^{(c)} + \gamma_1^{(c)} + C_k^{\phi^{(c)}} + C_k^{\tilde{\phi}^{(c)}}} \right]^{\mathbb{I}(m_{dn}=c)}$$

Where the R-terms are ratios of probabilities defined in equations (2a), (2b), and (2c). Equation 3d defines a distribution over all parameters for the word dn. One may sample from equation 3d by marginalizing out the parameters until a univariate distribution is reached. Then one may sample from the univariate distribution, condition the distribution, and back way up the tree.

This final result for the embodiment of FIG. 3C is similar to the one for the feature model embodiment depicted in FIG. 3B (which lacks speaking party segregation), except it contains two terms corresponding to the two word branches in this embodiment. Only one term is active for any given word, however; once the active term has been selected by the Kronecker function on speaking party indicator $m_{dn}$, probabilities are computed and variables are updated in precisely the same manner as in the embodiment of FIG. 3B.

5.4 the Pitman-Yor Process

Figure 4A:
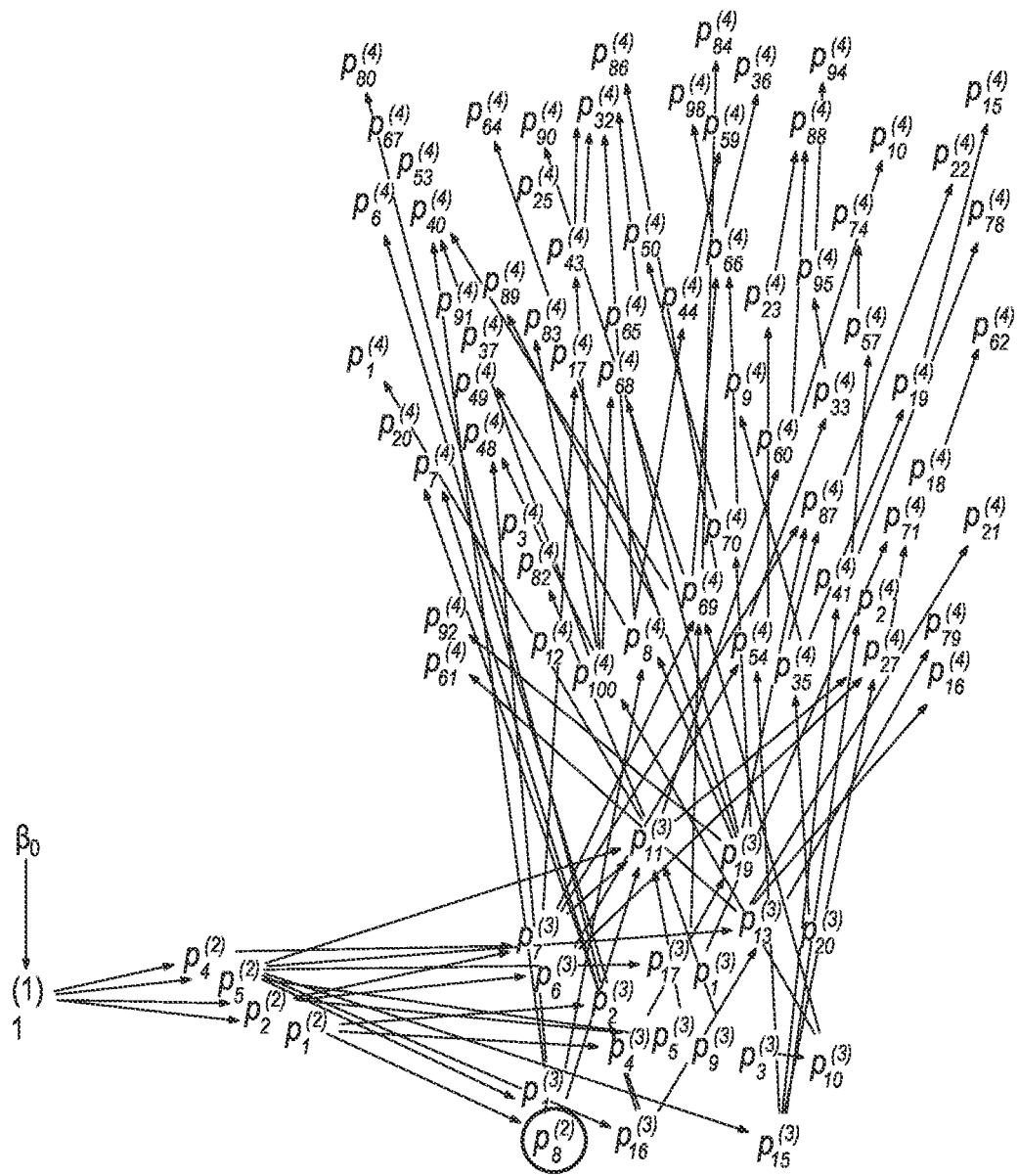
FIG. 4A illustrates a visualization of a plurality of probability distributions chained together by a hierarchical Pitman-Yor-Process (PYP).

FIG. 4A illustrates a visualization of a plurality of probability distributions chained together by a hierarchical Pitman-Yor process. As explained herein, customer counts at any given node represent the sum of the table counts over all of its children. Since model Z may support an arbitrary Bayesian Belief Network, such a sum can become computationally impractical.

This child summing problem may be solved by imposing a strict hierarchy on the probability distributions. Thus, related sets of distributions may be grouped together into related sets of distributions called nodes. Probabilities within a node can be termed draws. In an embodiment, grouping distributions together into nodes facilitates finding all of the children for any distribution. When summing over child distributions, three distinct cases are possible: one-to-one, one-to-all, and arbitrary.

Figure 4B:
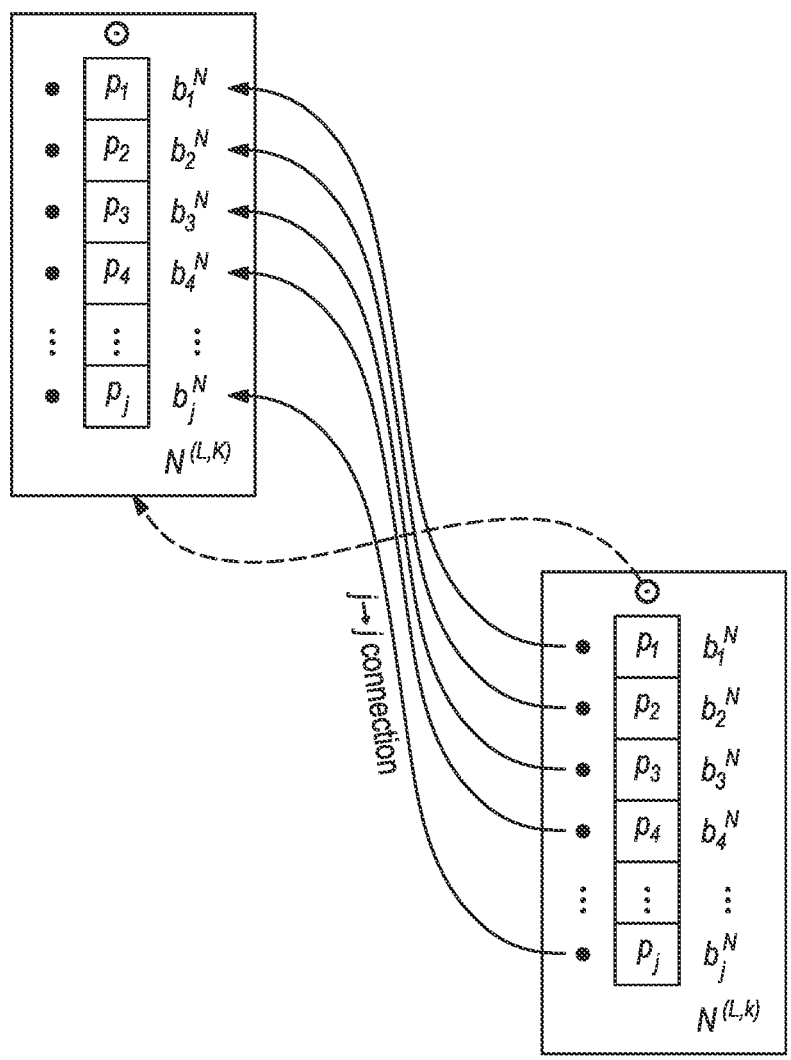
FIG. 4B illustrates a j to j connection node relationship in a PYP, in which both nodes have the same size and each draw's parent is in a corresponding position in the parent node.

FIG. 4B illustrates a j to j connection node relationship, in which both nodes have the same size and each draw's parent is in a corresponding position in the parent node. This is the one-to-one case.

Figure 4C:
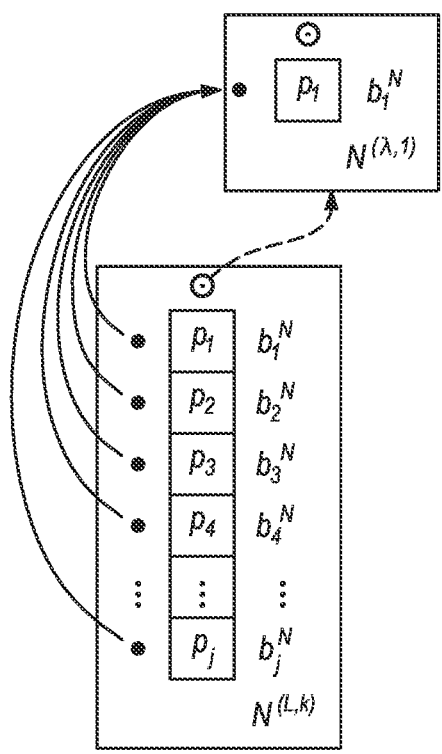
FIG. 4C illustrates a j to one, or prior-type connection in a PYP, in which every draw in the child node shares the same parent draw in the parent node.

FIG. 4C illustrates a j to one, or prior-type connection, in which every draw in the child node shares the same parent draw in the parent node. Here, table counts may be summed across all children. This is the one-to-all case.

Figure 4D:
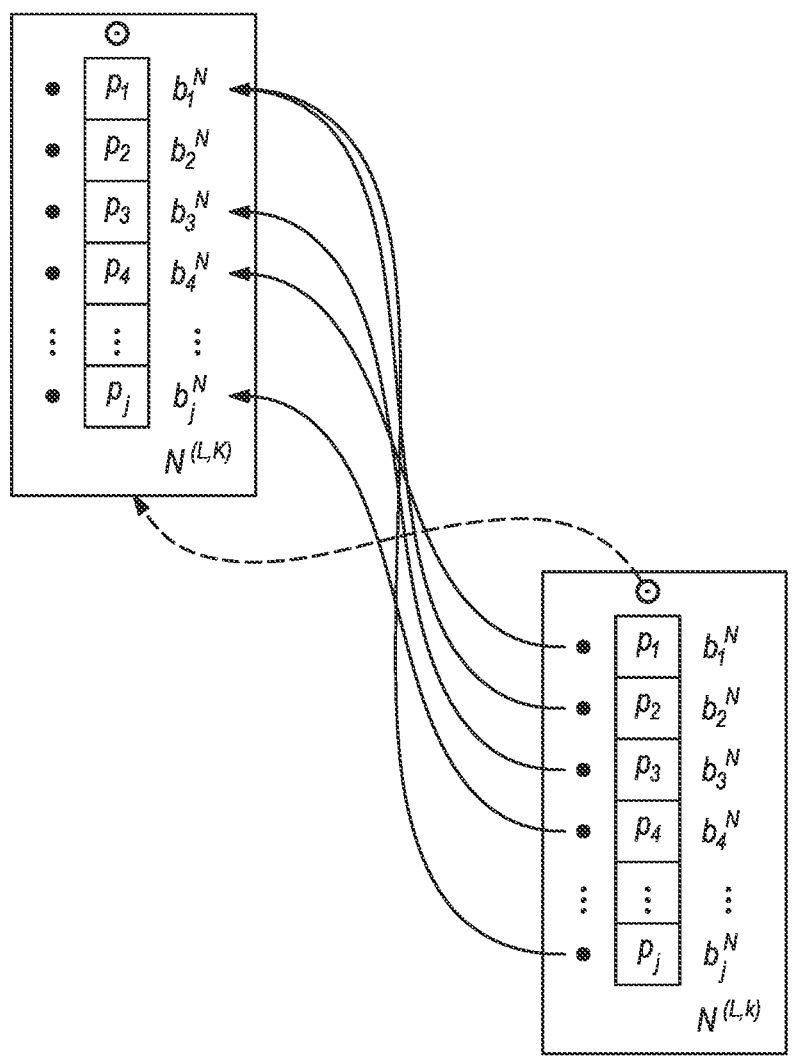
FIG. 4D illustrates a j to j', or group-type, connection in a PYP.

FIG. 4D illustrates a j to j', or group-type, connection. Here each draw in the child node may have an arbitrary parent draw in the parent node. This assignment may represent sampling for a random variable. Each parent must therefore sum over a variable (and potentially empty) number of children. This is the arbitrary case.

Figure 4E:
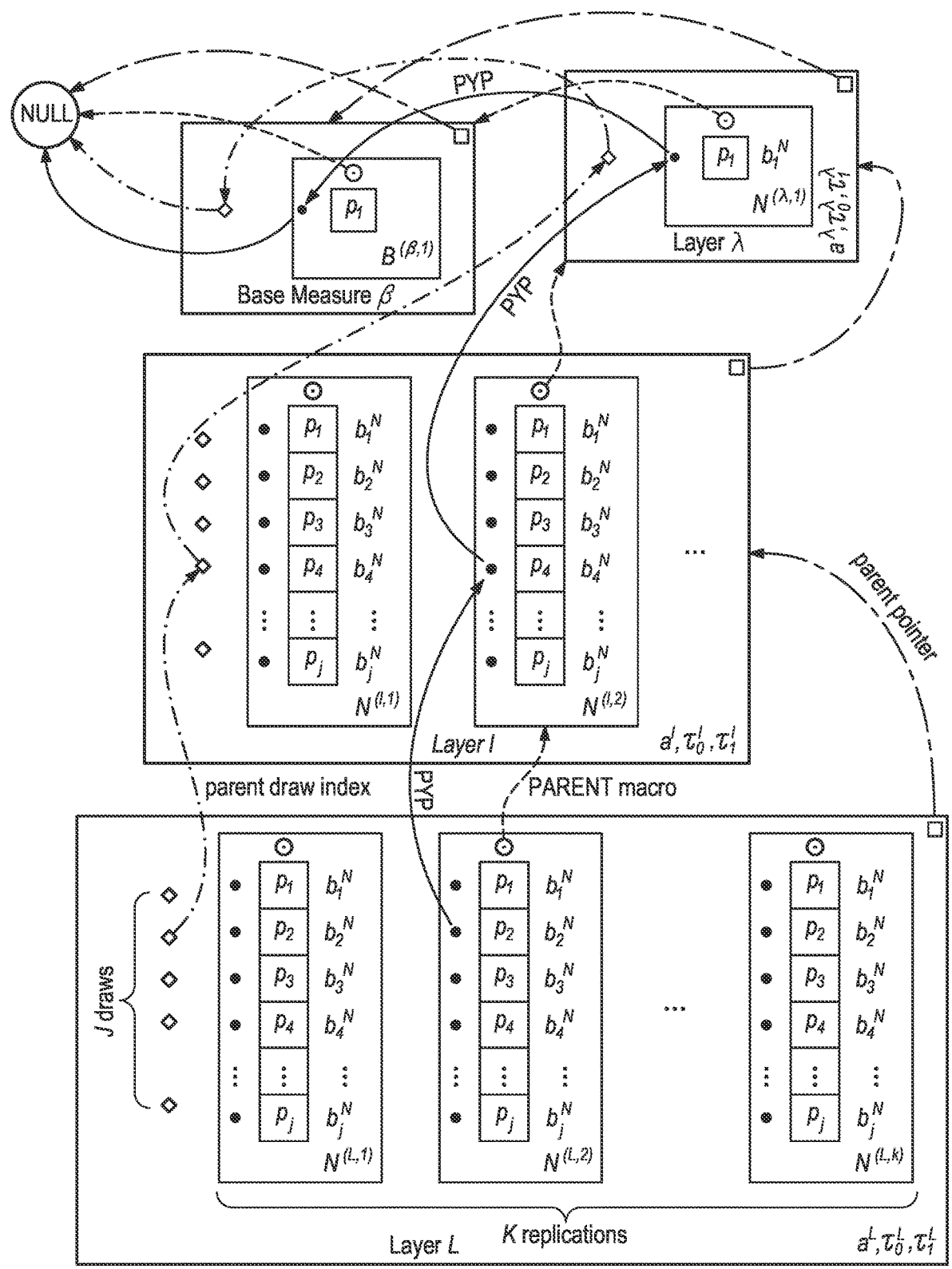

FIG. 4E illustrates, in an embodiment, the relation between probability distributions p and parent distributions in the Pitman-Yor-Process (PYP) with some associated concentration b and discount a. Probability distributions may be organized into nodes, and related nodes into layers. In an embodiment, parent distributions of all distributions in one node must all reside together in another node; and, parent nodes of all nodes in one layer must also reside together in another layer. Probability distributions within a node may be termed draws, while nodes with a layer may be termed replications. In the embodiment of FIG. 4E, the parent draw indices (diamonds) for all draws in a layer must be the same.

6. Topic, Classification, and Explainability Data Display

In one embodiment, after a semi-supervised topic model is trained, as described above, it is ready for use; it may receive call transcript data, or access stored call transcript data, and determine which topics were discussed on a call. After processing call transcript data for a target call and determining one or more topics of the call, embodiments may digitally store the target call transcript data with additional data indicating the one or more topics of the target call. Some embodiments may display the topics of the call in a Graphical User Interface (GUI) along with some call transcript data or other identifying information.

In one embodiment, the server computer provides topic information to the client computing device. The topic information may indicate, for each of a plurality of topics, a number or percentage of calls received for that topic over a particular period of time. For example, the server computer may send calls received for different topics on an hourly, daily, weekly, or monthly basis. The server computer may additionally provide options to customize the topic information. For example, the server computer may provide an interface where a client computing device specifies a start time/date and an end time/date. The server computer may provide the topic information for the specified period of time by identifying each call received during that period of time and incrementing a topic counter for each topic when a call was identified as corresponding to the topic.

The server computer may provide graphs that depict the topic information to the client computing device. For example, the server computer may generate a histogram with the x-axis corresponding to time intervals, such as hours, days, or weeks, and the y-axis corresponding to a number or percentage of calls that were received for a topic. Separate histograms may be provided for each topic and/or a joint histogram may be generated which includes a plurality of bars for each time interval, each of the plurality of bars corresponding to a different topic of a plurality of topics.

In one embodiment, the server computer further identifies the words that correspond to each of the topics, such as by computing the probabilities for words individually and identifying corresponding probabilities for different topics. As the topics may not be named in advance, specifying the words with the highest probabilities of being associated with a topic allow for easier identification of the topic. If the server computer receives input naming a particular topic, the server computer may update stored data to include the name of that topic for other data sent to the client computing device.

The server computer may use the identified words for each of the topics to generate a word bubble display for the client computing device. The word bubble display may include a plurality of bubbles, each corresponding to a different topic. The size of the bubble may correspond to the frequency with which the topic is discussed, with larger bubbles corresponding to topics that are discussed more frequently and smaller bubbles corresponding to topics that are discussed less frequently. The bubbles may include words inside them that correspond to the topic of the bubble. For example, a bubble for the topic of purchasing a vehicle may include the words "car", "price", "financing", and "credit".

The server computer may provide a graphical user interface to the client computing device with the topic information. The graphical user interface may provide charts and graphs for different and/or customizable time periods corresponding to call data provided by the client computing device. The graphical user interface may comprise insights to the call data, such as origins and destinations of the calls within different topics retrieved from metadata. The graphical user interface may additionally provide options to rename topics and/or merge topics.

In one embodiment, the topic information is provided to a real-time bidding platform where users bid on calls based on keywords of the call or other information. The topic information may additionally be used to intelligently route calls from a source to a destination.

In one embodiment, the server computer may provide a graphical user interface to the client computing device with explainability data stored with call transcripts, including data related to the causation of the labeling of one or more topics or the prediction of one or more outcomes or labels. The server computer 110 may cause highlighting or other identification of one or more topics in a digital representation of a call transcript which contributed most to a predicted label or outcome in the graphical user interface. In an embodiment, this highlighting or identification is instead, or additionally, effectuated on a per-word level, wherein one or more words in call transcript data most predictive of an assigned label or outcome are highlighted or otherwise identified in a digital representation of a call transcript. Server computer 110 may also provide to the client computing device explainability summary data which aggregates or summarizes one or more batches of the explainability data.

Figure 2:
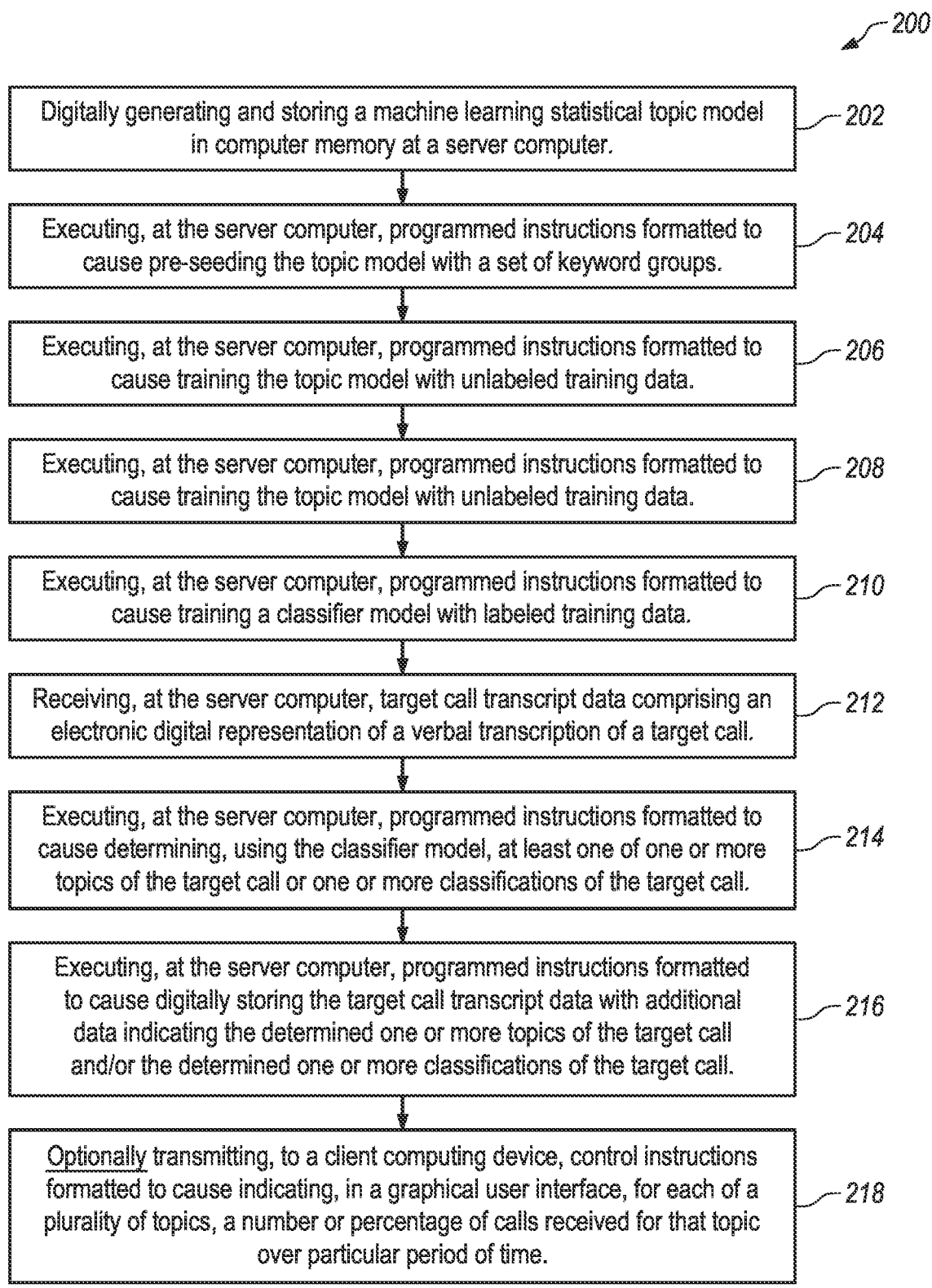
FIG. 2 illustrates an example programmed or computer-implemented process for programmatically determining one or more topics and/or classifications of a target call.

FIG. 2 illustrates an example programmed or computer-implemented process 200 for programmatically determining one or more topics and/or classifications of a target call. FIG. 2 is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In one embodiment, process 200 may be programmed to start execution at step 202 with digitally generating and storing a machine learning statistical topic model in computer memory at a server computer. FIG. 3B and FIG. 3C show examples of machine learning statistical topic models that may be implemented in various embodiments. Process 200 may be programmed to subsequently execute step 204 by executing, at the server computer, programmed instructions formatted to cause pre-seeding the topic model with a set of keyword groups. Process 200 may be programmed to subsequently execute step 206 by executing, at the server computer, programmed instructions formatted to cause training the topic model with unlabeled training data. Process 200 may be programmed to subsequently execute step 208 by executing, at the server computer, programmed instructions formatted to cause training the topic model with unlabeled training data. Process 200 may be programmed to subsequently execute step 210 by executing, at the server computer, programmed instructions formatted to cause training a classifier model with labeled training data. In embodiments, process 200 may be programmed to conjoin a classifier to the topic model to create the classifier model at step 210 or in any one of the prior steps of process 200. One example of a classifier model which may be implemented in various embodiments is depicted in FIG. 3A. Process 200 may be programmed to subsequently execute step 212 by receiving, at the server computer, target call transcript data comprising an electronic digital representation of a verbal transcription of a target call. Process 200 may be programmed to subsequently execute step 214 by executing, at the server computer, programmed instructions formatted to cause determining, using the classifier model, at least one of one or more topics of the target call. Process 200 may be programmed to subsequently execute step 216 by executing, at the server computer, programmed instructions formatted to cause digitally storing the target call transcript data with additional data indicating the determined one or more topics of the target call and/or the determined one or more classifications of the target call. Process 200 may be optionally programmed to subsequently execute step 218 by transmitting, to a client computing device, control instructions formatted to cause indicating, in a graphical user interface, for each of a plurality of topics, a number or percentage of calls received for that topic over a particular period of time. In various embodiments, process 200 may be programmed to execute less or different steps, or to execute the steps in a different order, or to repeat certain steps.

7. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
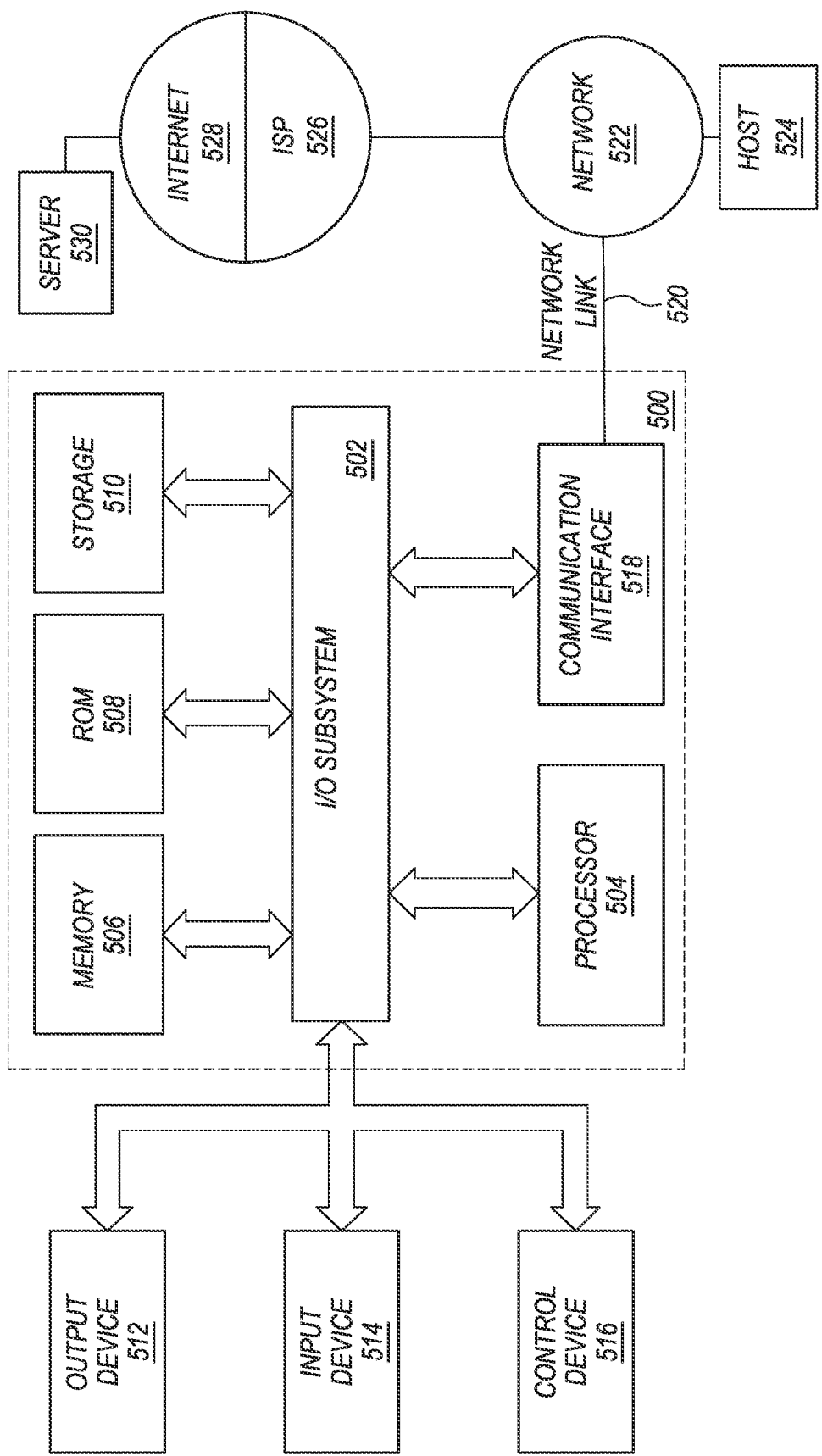
FIG. 5 is a block diagram that illustrates a computer system upon which one embodiment may be implemented.

FIG. 5 is a block diagram that illustrates an example computer system with which one embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such one embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In one embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In one embodiment, for security and reliability, an operating system may prevent direct communication between independent processes, providing strictly mediated and controlled inter-process communication functionality.

8. Benefits and Improvements

The disclosure has detailed improvements to machine-implemented natural language processing, specifically topic modeling, with numerous practical applications and benefits to technology. The internal architecture and execution flow of the topic model and classifier model disclosed herein, in combination, outperform similar processes of interpreting natural language in the form of call transcripts or other electronic documents. Consequently, the disclosure provides better ways to use computer assistance to understand topics that have been expressed in electronic documents. Embodiments enable digitally storing target call transcript data with additional data indicating the determined one or more topics of the target call and/or the determined one or more classifications of the target call, enabling the disclosed systems to output explanations and other metadata concerning topic identification that has occurred. These explanations, which may include information highlighting the most highly predictive words or topics resulting in a determined output label or classification for a call transcript, are the result of a novel method of merging programmatically generated data to produce new, usable digital objects. Moreover, the visual output techniques detailed in section 6 provide the practical benefit of visually displaying topics, classifications, and attendant explanations for a large mass of call transcripts, thereby providing to user computers new forms of data that did not exist before the use of the systems and processes of the disclosure.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics;
   programmatically pre-seeding the topic model with a set of keyword groups, each keyword group associating a respective set of keywords with a topic of the set of pre-seeded topics;
   programmatically training the topic model using unlabeled training data;
   conjoining a classifier to the topic model to create a classifier model, the classifier defining a joint probability distribution over topic vectors and one or more observed labels;
   programmatically training the classifier model using labeled training data;

receiving target call transcript data comprising an electronic digital representation of a verbal transcription of a target call;

programmatically determining, using the classifier model, at least one of one or more topics of the target call or one or more classifications of the target call; and digitally storing the target call transcript data with additional data indicating the determined one or more topics of the target call and/or the determined one or more classifications of the target call.

2. The method of claim 1, the topic model being programmed to model each word represented in the call transcript data as being drawn from one or more topic probability distributions of a plurality of topic probability distributions, the plurality of topic probability distributions comprising a plurality of mixture topic probability distributions each modeled as being drawn from a first type of prior distribution and being associated with a pre-seeded topic and a plurality of non-mixture topic probability distributions each modeled as being drawn from a second type of prior distribution and being associated with a non-pre-seeded topic.

3. The method of claim 2, the first type of prior distribution from which each mixture topic distribution is modeled as being drawn from being non-zero only for the words associated, by a keyword group, with the pre-seeded topic associated with that respective mixture topic distribution.

4. The method of claim 2, the machine learning statistical topic model defining, for each word represented in the unlabeled training data, a joint probability distribution over the word, a latent topic assignment of the word, and an indicator parameter, the indicator parameter denoting whether the word was associated, by a keyword group, with a pre-seeded topic.

5. The method of claim 1, the probability distribution of topics being modeled as a function of an inferred prior probability distribution which is modeled as a function of a flat prior distribution.

6. The method of claim 5, the probability distribution of topics being modeled as a function of the inferred prior probability distribution using a Pitman-Yor Process and the inferred prior probability distribution being modeled as a function of the flat prior distribution using a Pitman-Yor Process.

7. The method of claim 1, the classifier being programmed as a linear classifier comprising one of a Finnish Horseshoe Model, an L2 Logistic Regression, or a Logistic Regression using the Horseshoe Potential.

8. The method of claim 1, further comprising programmatically training the classifier model using a Rao-Blackwellization process and a Hamiltonian Monte Carlo algorithm to update the classifier.

9. The method of claim 1, the unlabeled training data comprising an initial set of call transcript data, each call transcript data of the initial set of call transcript data comprising an electronic digital representation of a verbal transcription of a call between a first person of a first person type and a second person of a second person type, the initial set of call transcript data having been created based on speech-to-text recognition of audio recordings of an initial set of calls.

10. The method of claim 1, further comprising transmitting, to a client computing device, control instructions formatted to cause indicating, in a graphical user interface, for each of a plurality of topics, a number or percentage of calls received for that topic over a particular period of time.

11. The method of claim 1, further comprising, responsive to receiving at a server computer, from a client computing device, a first feedback input indicating that one or more determined topics or classifications of the target call were incorrect, programmatically updating the classifier model based on the first feedback input.

12. The method of claim 11, further comprising, responsive to determining at the server computer, based on a set of feedback input comprising the first feedback input, that a prediction accuracy of the classifier model is below a threshold prediction accuracy, programmatically updating the classifier model using a corrective data set.

13. The method of claim 1, further comprising transmitting, to a client computing device, control instructions formatted to cause displaying, in a graphical user interface, explainability data related to a prediction of the one or more classifications of the target call, the explainability data indicating causation on at least one of a per-topic basis or a per-word basis.

14. A computer-implemented method, comprising:

digitally generating and storing a machine learning statistical topic model in computer memory, the topic model comprising a first word branch, a second word branch, and a topic branch, the topic model being programmed to receive, as input, call transcript data comprising first person type data digitally representing words spoken by a first person of a first person type in a call and second person type data digitally representing words spoken by a second person of a second person type in the call, the first person type data being modeled using the first word branch and the second person type data being modeled using the second word branch, the topic branch being programmed to model one or more topics of the call as a function of a probability distribution of topics, each of the one or more topics of the call being modeled as one of a pre-seeded topic or a non-pre-seeded topic;

programmatically pre-seeding the topic model with a set of keyword groups, each keyword group associating a respective set of keywords with a topic of a set of pre-seeded topics;

programmatically training the topic model using unlabeled training data;

conjoining a classifier to the topic model to create a classifier model, the classifier defining a joint probability distribution over topic vectors and one or more observed labels;

programmatically training the classifier model using labeled training data;

receiving target call transcript data comprising an electronic digital representation of a verbal transcription of a target call;

programmatically determining, using the classifier model, at least one of one or more topics of the target call or one or more classifications of the target call; and digitally storing the target call transcript data with additional data indicating the determined one or more topics of the target call and/or the determined one or more classifications of the target call.

15. The method of claim 14:

the first word branch being programmed to model the first person type data as being drawn from one or more topic probability distributions of a first plurality of topic probability distributions, the first plurality of topic probability distributions comprising a first plurality of mixture topic probability distributions each modeled as being drawn from a first type of prior distribution and being associated with a pre-seeded topic and a first plurality of non-mixture topic probability distributions each modeled as being drawn from a second type of prior distribution and being associated with a non-pre-seeded topic; and the second word branch being programmed to model the second person type data as being drawn from one or more topic probability distributions of a second plurality of topic probability distributions, the second plurality of topic probability distributions comprising a second plurality of mixture topic probability distributions each modeled as being drawn from the first type of prior distribution and being associated with a pre-seeded topic and a second plurality of non-mixture topic probability distributions each modeled as being drawn from the second type of prior distribution and being associated with a non-pre-seeded topic.

16. The method of claim 14, the probability distribution of topics being modeled as a function of an inferred prior probability distribution which is modeled as a function of a flat prior distribution.

17. The method of claim 16, the probability distribution of topics being modeled as a function of the inferred prior probability distribution using a Pitman-Yor Process and the inferred prior probability distribution being modeled as a function of the flat prior distribution using a Pitman-Yor Process.

18. A non-transitory storage medium storing instructions which, when executed by one or more processors, cause performance of a method comprising:
digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics;
programmatically pre-seeding the topic model with a set of keyword groups, each keyword group associating a respective set of keywords with a topic of the set of pre-seeded topics;
programmatically training the topic model using unlabeled training data;
conjoining a classifier to the topic model to create a classifier model, the classifier defining a joint probability distribution over topic vectors and one or more observed labels;
programmatically training the classifier model using labeled training data;
receiving target call transcript data comprising an electronic digital representation of a verbal transcription of a target call;
programmatically determining, using the classifier model, at least one of one or more topics of the target call or one or more classifications of the target call; and
digitally storing the target call transcript data with additional data indicating the determined one or more topics of the target call and/or the determined one or more classifications of the target call.

19. The storage medium of claim 18, the topic model being programmed to model each word represented in the call transcript data as being drawn from one or more topic probability distributions of a plurality of topic probability distributions, the plurality of topic probability distributions comprising a plurality of mixture topic probability distributions each modeled as being drawn from a first type of prior distribution and being associated with a pre-seeded topic and a plurality of non-mixture topic probability distributions each modeled as being drawn from a second type of prior distribution and being associated with a non-pre-seeded topic.

20. The storage medium of claim 19, the first type of prior distribution from which each mixture topic distribution is modeled as being drawn from being non-zero only for the words associated, by a keyword group, with the pre-seeded topic associated with that respective mixture topic distribution.

\* \* \* \* \*